US011910985B2

(12) United States Patent
Fording et al.

(10) Patent No.: US 11,910,985 B2
(45) Date of Patent: Feb. 27, 2024

(54) VACUUM CLEANER

(71) Applicant: Lowe's Companies, Inc., Mooresville, NC (US)

(72) Inventors: Jay Fording, Davidson, NC (US); Eduardo Gonzalez, Huntersville, NC (US); Michael McDermott, Davidson, NC (US); Claude E. Reynolds, Jr., Mooresville, NC (US); James Townsend, Mooresville, NC (US); Trevor N. Devine, Statesville, NC (US); Steven P. Gerstein, Huntersville, NC (US); Kevin D. Fry, South Williamsport, PA (US)

(73) Assignee: Lowe's Companies, Inc., Mooresville, NC (US)

( * ) Notice: Subject to any disclaimer, the term of this patent is extended or adjusted under 35 U.S.C. 154(b) by 302 days.

(21) Appl. No.: 17/357,825

(22) Filed: Jun. 24, 2021

(65) Prior Publication Data
US 2021/0315429 A1 Oct. 14, 2021

Related U.S. Application Data

(62) Division of application No. 16/154,472, filed on Oct. 8, 2018, which is a division of application No.
(Continued)

(51) Int. Cl.
*A47L 5/36* (2006.01)
*A47L 9/32* (2006.01)
(Continued)

(52) U.S. Cl.
CPC .............. *A47L 5/365* (2013.01); *A47L 9/32* (2013.01); *A47L 9/327* (2013.01); *A01K 13/00* (2013.01);
(Continued)

(58) Field of Classification Search
CPC .............................. A47L 9/0027; A47L 5/365
See application file for complete search history.

(56) References Cited

U.S. PATENT DOCUMENTS 3,778,863 A 12/1973 Westergren et al.
3,858,272 A * 1/1975 Bard ....................... A47L 5/365
55/357
(Continued)

FOREIGN PATENT DOCUMENTS

CN 1425350 6/2003
CN 1575728 2/2005
(Continued)

OTHER PUBLICATIONS

U.S. Appl. No. 14/870,851, "Corrected notice of Allowability", dated Jul. 18, 2018, 7 pages.
(Continued)

*Primary Examiner* — Bryan R Muller
(74) *Attorney, Agent, or Firm* — Kilpatrick Townsend & Stockton LLP

(57) ABSTRACT

Embodiments of the present invention described herein relate to vacuum cleaners. The vacuum cleaners described herein can include a motor, a lid, a collection receptacle, and at least one support member to permit access to the interior of the vacuum cleaner. Also described herein are vacuum cleaners having a motor, a lid, a collection receptacle, and an accessory holder that can be pivotally mounted to the collection receptacle to permit access to the contents thereof.

27 Claims, 15 Drawing Sheets

Related U.S. Application Data

14/870,851, filed on Sep. 30, 2015, now Pat. No. 10,111,562.

(51) Int. Cl.

| | | |
|---|---|---|
| A47L 7/00 | (2006.01) | |
| A47L 9/00 | (2006.01) | |
| A47L 9/26 | (2006.01) | |
| A01K 13/00 | (2006.01) | |
| A47L 9/12 | (2006.01) | |
| A47L 9/14 | (2006.01) | |
| A47L 9/28 | (2006.01) | |

(52) U.S. Cl.
CPC .......... *A47L 7/0004* (2013.01); *A47L 7/0009* (2013.01); *A47L 7/0038* (2013.01); *A47L 9/0027* (2013.01); *A47L 9/0036* (2013.01); *A47L 9/12* (2013.01); *A47L 9/1481* (2013.01); *A47L 9/26* (2013.01); *A47L 9/2868* (2013.01)

(56) References Cited

U.S. PATENT DOCUMENTS

| | | |
|---|---|---|
| 4,554,700 A | 11/1985 | Lyman |
| 5,233,722 A | 8/1993 | McKnight et al. |
| 5,455,983 A | 10/1995 | Crouser et al. |
| 7,159,272 B2 | 1/2007 | Holsten et al. |
| 8,418,312 B2 | 4/2013 | Rhea et al. |
| 8,973,196 B2 | 3/2015 | Tomasiak |
| 8,997,308 B2 | 4/2015 | Cortes Ruiz et al. |
| 9,420,929 B2 | 8/2016 | Hensel et al. |
| 9,572,464 B2 | 2/2017 | Wehner |
| 9,572,646 B2 | 2/2017 | Tapocik |
| 10,111,562 B2 | 10/2018 | Fording et al. |
| 2009/0265882 A1 | 10/2009 | Rhea et al. |
| 2017/0086630 A1 | 3/2017 | Fording et al. |

FOREIGN PATENT DOCUMENTS

| | | | | |
|---|---|---|---|---|
| CN | 202699035 | | 1/2013 | |
| CN | 104244790 | | 12/2014 | |
| CN | 104519777 | | 4/2015 | |
| CN | 104519777 A | * | 4/2015 | ............. A47L 5/365 |
| CN | 106993982 | | 8/2017 | |
| EP | 1208786 | | 5/2002 | |
| WO | 2005039375 | | 5/2005 | |
| WO | 2013135482 | | 9/2013 | |

OTHER PUBLICATIONS

U.S. Appl. No. 14/870,851, Notice of Allowance, dated Jun. 27, 2018, 10 pages.
U.S. Appl. No. 14/870,851, "Restriction Requirement", dated Mar. 7, 2018, 9 pages.
Application No. CA2,943,757, Notice of Allowance, dated Sep. 6, 2018, 1 page.
Application No. CA2,943,757, Office Action, dated Nov. 17, 2017, 4 pages.
Application No. CN201610875202.X, Office Action, dated Jan. 12, 2021, 11 pages.
Application No. CN201610875202.X, Office Action, dated Oct. 9, 2019, 12 pages.
Application No. CN201610875202.X, Office Action, dated Jun. 8, 2020, 13 pages.
U.S. Appl. No. 16/154,472, Non-Final Office Action, dated Apr. 5, 2022, 12 pages.
U.S. Appl. No. 16/154,472, Non-Final Office Action, dated Jul. 2, 2021, 12 pages.
Application No. CN201610875202.X, Office Action, dated Jun. 25, 2021, 12 pages.
U.S. Appl. No. 16/154,472, Final Office Action, dated Nov. 30, 2021, 13 pages.
U.S. Appl. No. 16/154,472, "Final Office Action", dated Oct. 31, 2022, 14 pages.
CA Patent Application No. 3,015,408, "Office Action", dated Oct. 21, 2022, 5 pages.

* cited by examiner

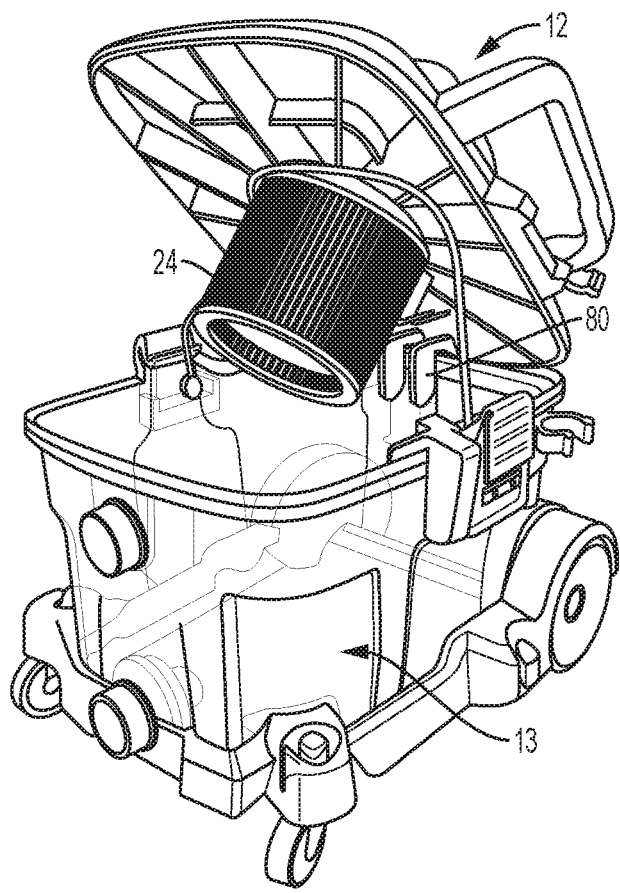
FIG. 14
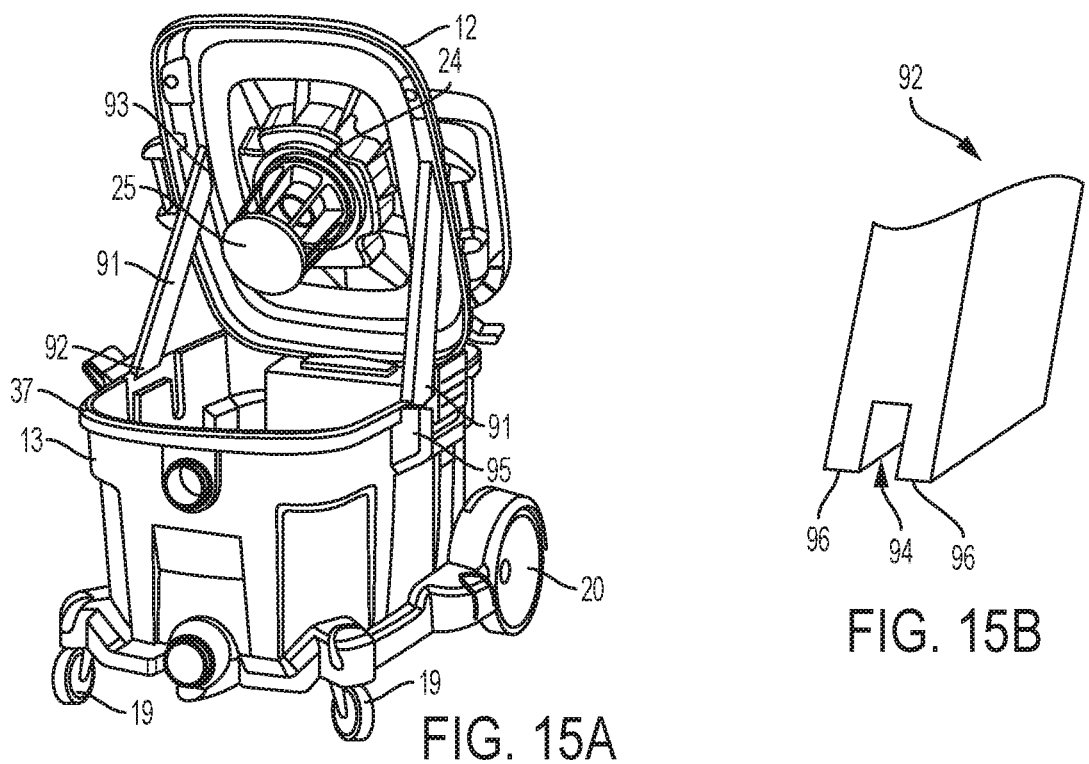
FIG. 15A
FIG. 15B

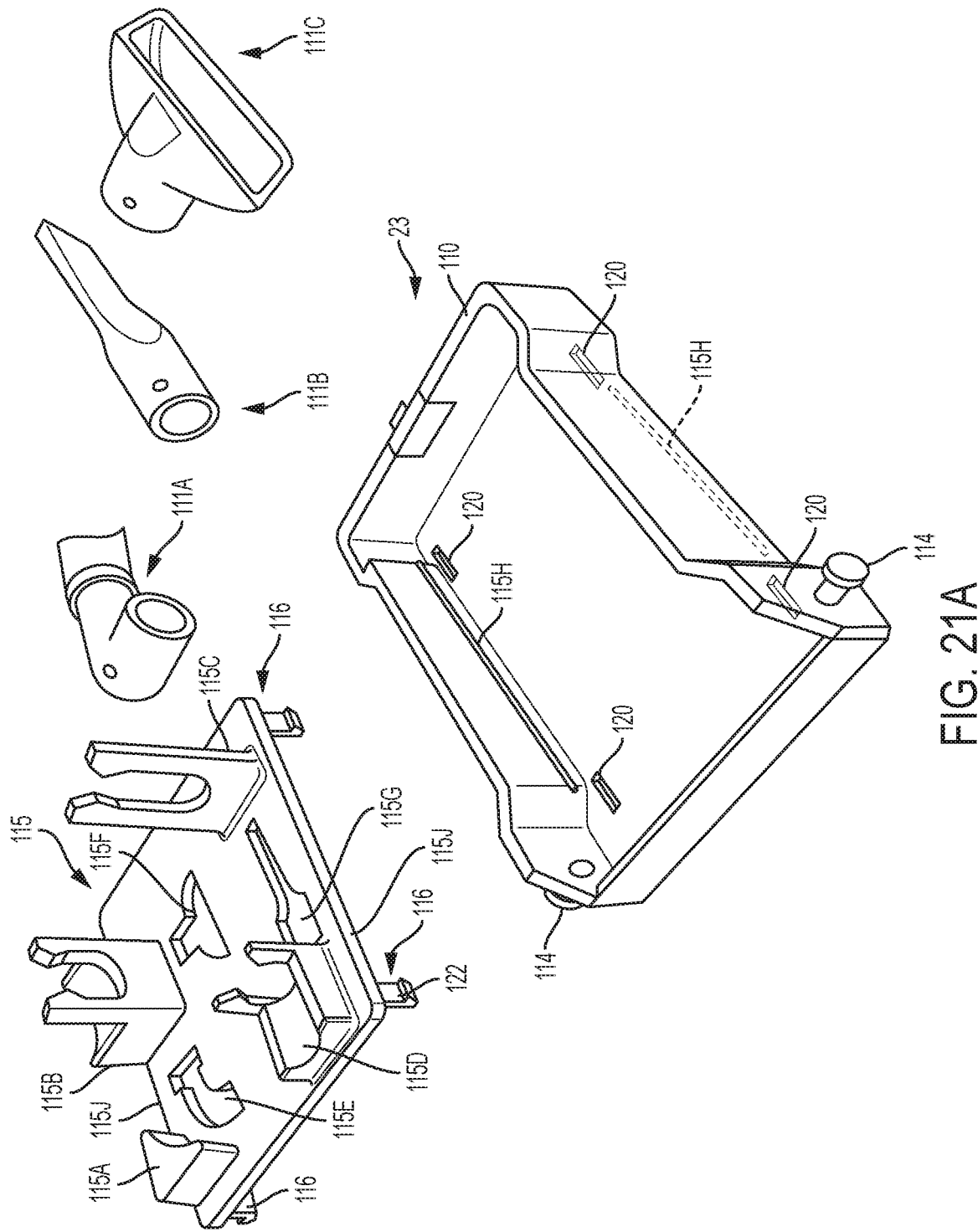

VACUUM CLEANER

CROSS-REFERENCES TO RELATED APPLICATIONS

This application is a divisional of U.S. application Ser. No. 16/154,472, filed Oct. 8, 2018, which is a divisional of U.S. application Ser. No. 14/870,851, filed Sep. 30, 2015, now patented as U.S. Pat. No. 10,111,562, granted on Oct. 30, 2018, the entire contents of which are hereby incorporated in its entirety for all purposes.

FILED OF THE INVENTION

Embodiments of the present invention relate generally to vacuum cleaners, including systems to provide access to the interior region of a vacuum cleaner and vacuum cleaners having accessory holders.

BACKGROUND

Conventional vacuum cleaners, including "wet-dry" vacuums, are popular devices that are often used in many settings. Vacuum cleaners generally include a tank or collection vessel, a lid, and motor assembly. A filter is employed within the vacuum cleaner to filter a fluid stream in the vacuum cleaner as matter or debris is collected into the tank or collection vessel during operation of the vacuum cleaner. After operating a vacuum cleaner for a period of time, the tanks or collection vessels can require frequent cleaning and emptying of debris. The process of cleaning and emptying collection vessels can itself spread previously collected debris requiring a user to re-clean a surface after the cleaning of the tank has been completed.

Vacuum cleaners often have numerous accessories helpful for different tasks. These accessories often vary in size, shape, and functionality. Conventional vacuum cleaners have limited storage capacity and include a plurality of external clips or secondary structures, for example, a separate bin or bucket. These conventional systems for storing accessories often result in inefficiencies and frustration to a user associated with difficulties in finding the right accessories.

Additionally, conventional wet-dry vacuums often are large units that create problems with mobility and storage of the vacuums. Some conventional vacuums include large hoses and may not provide adequate means to secure the hose in a compact manner.

In general, it would be advantageous to have improved vacuum cleaners and systems for using and accessing portions of vacuum cleaners and their accessories. Some of the embodiments of the invention described herein seek to provide vacuum cleaners that provide a number of advantages of existing vacuum cleaners.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Various embodiments of the present invention relate to vacuum cleaners and components thereof. Certain embodiments described herein provide a vacuum cleaner comprising a motor configured to suction matter into the vacuum cleaner through an input port of the vacuum cleaner; a collection receptacle for receiving matter collected by the vacuum cleaner; a lid adapted to cover the collection receptacle; a filter carrier adapted to hold at least one filter to the lid and positioned so that, during operation of the vacuum cleaner, matter collected by the vacuum cleaner is filtered from at least one fluid stream in the vacuum cleaner; and at least one support member adapted to hold the lid stably in an access orientation that allows manual access to the at least one filter for removal from the filter carrier or cleaning of the at least one filter while the at least one filter is located over the collection receptacle, the at least one support member being positionable with respect to the lid or the collection receptacle so as to free the lid to move from the access orientation to a closed orientation with respect to the collection receptacle.

In another embodiment, a vacuum cleaner comprises: a motor configured to suction matter into the vacuum cleaner through an input port of the vacuum cleaner; a collection receptacle for receiving matter collected by the vacuum cleaner; a lid adapted to cover the collection receptacle; and an accessory holder comprising a first accessory retainer removably attached to the accessory holder so that the first accessory retainer can be removed and replaced by at least a second accessory retainer that: (1) has a different configuration from the first accessory retainer and (2) is adapted to retain at least one accessory that is different in configuration or function from any accessories that the first accessory retainer is adapted to retain.

In some embodiments, a vacuum cleaner comprises: a motor configured to suction matter into the vacuum cleaner through an input port of the vacuum cleaner; a collection receptacle for receiving matter collected by the vacuum cleaner; a lid adapted to cover the collection receptacle; and an accessory holder pivotally mounted so as to face an outside wall of the collection receptacle when the accessory holder is in a closed orientation and so as to be pivotable away from the outside wall, toward an open orientation that allows access to accessories held by the accessory holder.

In yet other embodiments described herein, a vacuum cleaner comprises: a motor configured to suction matter into the vacuum cleaner through an input port of the vacuum cleaner; a collection receptacle for receiving matter collected by the vacuum cleaner; a lid adapted to cover the collection receptacle; a filter carrier adapted to hold at least one filter to the lid and positioned so that, during operation of the vacuum cleaner, matter collected by the vacuum cleaner is filtered from at least one fluid stream in the vacuum cleaner; and at least one support member adapted to apply a force that holds the lid stably in an access orientation that allows manual access to the at least one filter for removal from the filter carrier or cleaning of the at least one filter while the at least one filter is located over the collection receptacle, the at least one support member being arranged so that the force is manually opposable to move the lid from the access orientation to a closed orientation with respect to the collection receptacle.

These and other embodiments are presented in greater detail in the Detailed Description which follows.

BRIEF DESCRIPTION OF THE DRAWINGS

FIG. 14 shows a side perspective view of a vacuum cleaner according to one embodiment of the present invention.

FIG. 15A shows a front perspective view of a vacuum cleaner according to one embodiment of the present invention.

FIG. 15B shows a front view of a portion of a support member shown in the vacuum cleaner shown in FIG. 15A according to one embodiment of the present invention.

FIG. 21A shows a perspective view of an accessory holder according to one embodiment of the present invention.

DETAILED DESCRIPTION

Figure 1:
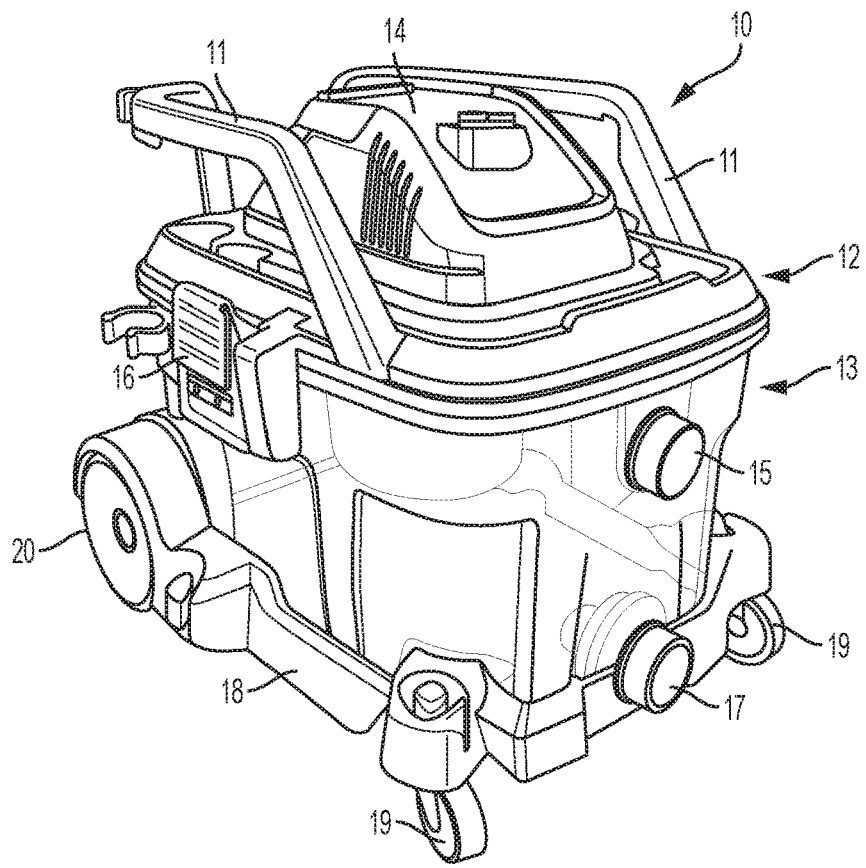
FIG. 1 shows a front, side perspective view of a vacuum cleaner according to one embodiment of the present invention.

The subject matter of embodiments of the present invention is described here with specificity to meet statutory requirements, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. The illustrative examples are given to introduce the reader to the general subject matter discussed herein and not intended to limit the scope of the disclosed concepts. The following sections describe various additional embodiments and examples with reference to the drawings in which like numerals indicate like elements and directional description are used to describe illustrative embodiments but, like the illustrative embodiments, should not be used to limit the present invention.

Embodiments of the present invention relate to vacuum cleaners. Certain embodiments described herein provide a vacuum cleaner comprising a motor configured to suction matter into the vacuum cleaner through an input port of the vacuum cleaner; a collection receptacle for receiving matter collected by the vacuum cleaner; a lid adapted to cover the collection receptacle; a filter carrier adapted to hold at least one filter to the lid and positioned so that, during operation of the vacuum cleaner, matter collected by the vacuum cleaner is filtered from at least one fluid stream in the vacuum cleaner; and at least one support member adapted to hold the lid stably in an access orientation that allows manual access to the at least one filter for removal from the filter carrier or cleaning of the at least one filter while the at least one filter is located over the collection receptacle, the at least one support member being positionable with respect to the lid or the collection receptacle so as to free the lid to move from the access orientation to a closed orientation with respect to the collection receptacle.

In some embodiments, the at least one support member can be mounted to the collection receptacle and be adapted to serve as a handle when contents of the collection receptacle are being dumped out. In some embodiments, the at least one support member includes a grip portion adapted to be more comfortable to the grasp than other portions of the at least one support member. In some embodiments, the grip portion can include knurling or finger recesses. The grip portion can be rotatably connected to another portion of the at least one support member in certain embodiments.

The lid of certain vacuum cleaners described herein can be pivotable between the access orientation and the closed orientation. In some embodiments, the at least one support member can be pivotally mounted to the collection receptacle, and the lid can be pivotable between the access orientation and the closed orientation. In some embodiments, the at least one support member can be pivotally mounted to the lid, and the lid can be pivotable between the access orientation and the closed orientation. In some embodiments, the at least one support member is configured so that the access orientation achieves an opening between the collection receptacle and the lid that is large enough to allow the removal of the at least one filter entirely out from the vacuum cleaner.

In some embodiments, the at least one support member is spring-biased toward a grasp facilitating orientation. The grasp facilitating orientation is different from an orientation in which the at least one support member is placed when the lid is in the closed orientation. In some such embodiments, the vacuum cleaner can include a release mechanism configured to hold the at least one support member in the orientation in which the at least one support member is placed when the lid is in the closed orientation. The release mechanism can be actuatable to release the at least one support member to spring into the grasp facilitating orientation.

In some embodiments, the vacuum cleaner can include at least one stop that is engageable by the at least one support member when the lid is oriented in the access orientation, and adapted to provide stability for the lid in the access orientation. In some embodiments, the vacuum cleaner can include at least one catch that is engageable by the at least one support member when the lid is oriented in the access orientation, the catch being adapted to resist removal of the at least one support member from the catch and also being adapted to provide stability for the lid in the access orientation. The catch can be configured to prevent removal of the at least one support member from the catch until a predetermined force is applied to the at least one support member in a direction away from the catch, wherein the predetermined force is greater than a force that the lid exerts on the support member when the lid remains at rest in the access orientation. In some embodiments, the catch includes a release mechanism that can be actuated to facilitate disengagement of the at least one support member from the catch.

In certain embodiments, the vacuum cleaner includes a support member holder adapted to hold the at least one support member in an orientation in which the at least one support member does not interfere with access to contents of the collection receptacle. In some embodiments, the at least one support member holder comprises at least one ledge on at least one inside wall of the collection receptacle.

In certain embodiments, the lid can include at least one rim engager adapted to engage a rim of the collection receptacle when the lid is placed in the access orientation and adapted to interfere with disengagement of the lid from the rim. In some embodiments, the collection receptacle can include at least one edge engager adapted to engage an edge of the lid when the lid is placed in the access orientation and adapted to interfere with disengagement of the edge from the collection receptacle.

In some embodiments, the vacuum cleaner can include at least one hose retainer on an upper portion of the vacuum cleaner. The at least one hose retainer can be adapted to retain a vacuum cleaner hose in a coiled configuration.

In some embodiments, the vacuum cleaner can include an accessory holder comprising a first accessory retainer removably attached to the accessory holder so that the first accessory retainer can be removed and replaced by at least a second accessory retainer that: (1) has a different configuration from the first accessory retainer and (2) is adapted to retain at least one accessory that is different in configuration or function from any accessories that the first accessory retainer is adapted to retain. In some embodiments, the accessory holder is removable from the collection receptacle and is replaceable by at least a second accessory holder that: (1) has a different configuration from the accessory holder and (2) is adapted to retain at least one accessory that is different in configuration or function from any accessories that the accessory holder is adapted to retain.

In another embodiment, a vacuum cleaner comprises: a motor configured to suction matter into the vacuum cleaner through an input port of the vacuum cleaner; a collection receptacle for receiving matter collected by the vacuum cleaner; a lid adapted to cover the collection receptacle: and an accessory holder comprising a first accessory retainer removably attached to the accessory holder so that the first accessory retainer can be removed and replaced by at least a second accessory retainer that: (1) has a different configuration from the first accessory retainer and (2) is adapted to retain at least one accessory that is different in configuration or function from any accessories that the first accessory retainer is adapted to retain.

In certain embodiments, the accessory holder is pivotally mounted so as to face an outside wall of the collection receptacle when the accessory holder is in a closed orientation and so as to be pivotable away from the outside wall, toward an open orientation that allows access to accessories retained by the first accessory retainer. The accessory holder can be configured to be manually removable from the vacuum cleaner in a tool-less manner. In some embodiments, the accessory holder can be removably connected to the collection receptacle by a slot-and-peg coupling. In certain embodiments, the accessory holder can include a retention mechanism for keeping the accessory holder in the closed orientation where the retention mechanism is manually releasable to allow pivoting of the accessory holder away from the outside wall.

In various embodiments, the first accessory retainer is configured to retain an assortment of accessories adapted to draw liquid into the vacuum cleaner and the second accessory retainer is configured to retain another assortment of accessories adapted to draw dry matter into the vacuum cleaner.

The accessory holder can be configured to cooperate with an outside wall of the collection receptacle to substantially enclose accessories retained by the first accessory retainer when the accessory holder is in a closed orientation.

In some embodiments, a vacuum cleaner comprises: a motor configured to suction matter into the vacuum cleaner through an input port of the vacuum cleaner; a collection receptacle for receiving matter collected by the vacuum cleaner; a lid adapted to cover the collection receptacle: and an accessory holder pivotally mounted so as to face an outside wall of the collection receptacle when the accessory holder is in a closed orientation and so as to be pivotable away from the outside wall, toward an open orientation that allows access to accessories held by the accessory holder.

In some such embodiments, the accessory holder can be configured to be manually removable from the vacuum cleaner in a tool-less manner. In some embodiments, the accessory holder can be removably connected to the collection receptacle by a slot-and-peg coupling. In certain embodiments, the accessory holder can include a retention mechanism for keeping the accessory holder in the closed orientation where the retention mechanism is manually releasable to allow pivoting of the accessory holder away from the outside wall.

In certain embodiments, the vacuum cleaner can include a first accessory retainer removably attached to the accessory holder so that the first accessory retainer can be removed and replaced by a second accessory retainer, the first accessory retainer being configured to retain an assortment of accessories adapted to draw liquid into the vacuum cleaner and the second accessory retainer being configured to retain another assortment of accessories adapted to draw dry matter into the vacuum cleaner.

The accessory holder can be configured to cooperate with an outside wall of the collection receptacle to substantially enclose accessories retained by the first accessory retainer when the accessory holder is in a closed orientation.

In some embodiments, the accessory holder is removable from the collection receptacle and is replaceable by at least a second accessory holder that: (1) has a different configuration from the accessory holder and (2) is adapted to retain at least one accessory that is different in configuration or function from any accessories that the accessory retainer is adapted to retain.

In yet other embodiments described herein, a vacuum cleaner comprises: a motor configured to suction matter into the vacuum cleaner through an input port of the vacuum cleaner; a collection receptacle for receiving matter collected by the vacuum cleaner; a lid adapted to cover the collection receptacle; a filter carrier adapted to hold at least one filter to the lid and positioned so that, during operation of the vacuum cleaner, matter collected by the vacuum cleaner is filtered from at least one fluid stream in the vacuum cleaner; and at least one support member adapted to apply a force that holds the lid stably in an access orientation that allows manual access to the at least one filter for removal from the filter carrier or cleaning of the at least one filter while the at least one filter is located over the collection receptacle, the at least one support member being arranged so that the force is manually opposable to move the lid from the access orientation to a closed orientation with respect to the collection receptacle.

In certain embodiments, the lid can be pivotally connected to the collection receptacle, and the at least one support member includes a spring that biases the lid toward the access orientation with the force that can be manually opposed to move the lid from the access orientation into the closed orientation. In some embodiments, the support member includes a hinge that allows the lid to pivot between the access orientation and the closed orientation. In some embodiments, the at least one support member is configured so that the access orientation achieves an opening between the collection receptacle and the lid that is large enough to allow the removal of the at least one filter entirely out from the vacuum cleaner.

In some embodiments, a vacuum cleaner can include a locking mechanism that holds the lid in the closed orientation and which is releasable to allow the lid to move into the access orientation.

In some embodiments, the vacuum cleaner can include at least one hose retainer on an upper portion of the vacuum cleaner. The at least one hose retainer can be adapted to retain a vacuum cleaner hose in a coiled configuration.

In some embodiments, the vacuum cleaner can include an accessory holder comprising a first accessory retainer removably attached to the accessory holder so that the first accessory retainer can be removed and replaced by at least a second accessory retainer that: (1) has a different configuration from the first accessory retainer and (2) is adapted to retain at least one accessory that is different in configuration or function from any accessories that the first accessory retainer is adapted to retain.

Embodiments of the present invention described herein can provide vacuum cleaners that minimize the amount of debris that is transferred to a work surface upon the removal and cleaning of a filter with collected debris embedded in the filter substrate. For example, in conventional vacuum cleaners, the user is required to remove a lid and set it aside away from the collection receptacle when the user desires to change or clean a filter or otherwise access the contents of the collection receptacle.

Often in such work flow scenarios, the removal and placement of a dirty filter or lid with collected debris embedded in the filter substrate causes the dirt and other collected particulates to be transferred to the underside of the lid or from the filter to the floor or other surface where the lid has been relocated while emptying the collection receptacle. Some embodiments described herein provide a system that allows access to the collection receptacle and filter while maintaining the position of the filter over the collection receptacle. Some embodiments described herein provide easy access to the filter and position the cleaning location of the filter central to the collection receptacle reducing the chance of further debris reaching a surface outside of the collection receptacle. By providing easier access to the filter, embodiments described herein may promote more regular cleaning and maintenance of dirty filters.

Additional problems with conventional vacuum cleaners relate to existing attachment or accessory storage solutions. Vacuum cleaners, and particularly wet-dry vacuums, are purposed for many different types of diverse cleaning activities. This has led to more accessories and attachment ends to be designed and developed to meet the specific needs of a cleaning task. The storage of this large number of accessories is often an afterthought for conventional vacuum cleaners. Some embodiments described herein can provide a system that efficiently organizes and retains different accessories and accessory sets that can be used for different cleaning tasks.

Certain aspects of the present invention will now be discussed in connection with the attached Figures which illustrate some embodiments of the present invention. Although the description associated with the Figures will focus on embodiments shown in the Figures, it should be understood that only slight modifications need to be made to the components in order to provide vacuum cleaners embodying the inventive concepts described in this application. Referring to the Figures, the numbers used within each figure are consistent with every other figure. When a specific feature is labeled in one figure with a specific numeral, the same numeral will be used in other figures when denoting that specific feature.

FIGS. 1-26 illustrate various components and embodiments of a vacuum cleaner. While various components are illustrated and described in connection with FIGS. 1-26, it should be understood that not all systems according to the present invention may utilize each of the components and features illustrated and described.

FIG. 1 is front, top perspective view of a vacuum cleaner 10. The vacuum cleaner 10 includes a lid 12 and a collection receptacle 13. The lid 12 includes peripheral rail 11 that extends up from the base of lid 12. As described in more detail below, the peripheral rail 11 can provide a hose retainer that is adapted to retain a vacuum cleaner hose (not shown) in a coiled configuration. The peripheral rail 11 can provide a handle useful for moving and transporting the vacuum cleaner 10.

The lid 12 includes a housing 14 which houses a motor configured to suction matter into the vacuum cleaner 10 through an input port of the vacuum cleaner 10. The matter suctioned into the vacuum cleaner 10 is received and collected in the collection receptacle 13. In some embodiments, the collection receptacle 13 can comprise a transparent or translucent material that can permit a user to view the contents of the matter being suctioned into the vacuum cleaner 10. In other embodiments, the collection receptacle 13 can comprise an opaque material.

The collection receptacle 13 includes a first port 15 and a second port 17. The second port 17 can provide an outlet port to drain the contents of the collection receptacle 13, for example when the vacuum cleaner 10 is used to suction liquid matter or, for example, when the collection receptacle 13 is cleaned. The collection receptacle 13 is seated within a base 18 that comprises a plurality of wheels 19, 20. As shown in FIG. 1, the plurality of wheels includes a pair of front wheels 19 and a pair of rear wheels 20 (where only one of the rear wheels 20 is shown in FIG. 1).

The lid 12 is seated on the top edge portion of the collection receptacle 13. In some embodiments, a gasket can be positioned between the lid 12 and the collection receptacle 13 to provide a sealed system that may improve suction of the vacuum cleaner 10. The lid 12 is locked into position on the collection receptacle 13 by latch 16. A second latch configured to lock the lid 12 onto the collection receptacle 13 can be included on the opposite side (not viewable in FIG. 1) of the vacuum cleaner 10. The latch 16 can provide a secure connection to avoid or minimize any spilling of the collection receptacle 13 during use of the vacuum cleaner 10. The latch 16 provides a locking mechanism that holds the lid 12 in the closed orientation. The latch 16 is releasable to allow the lid 12 to move into the access orientation. The vacuum cleaner 10 in FIG. 1 is shown with a lid 12 in a closed orientation with respect to the collection receptacle 13.

Figure 2:
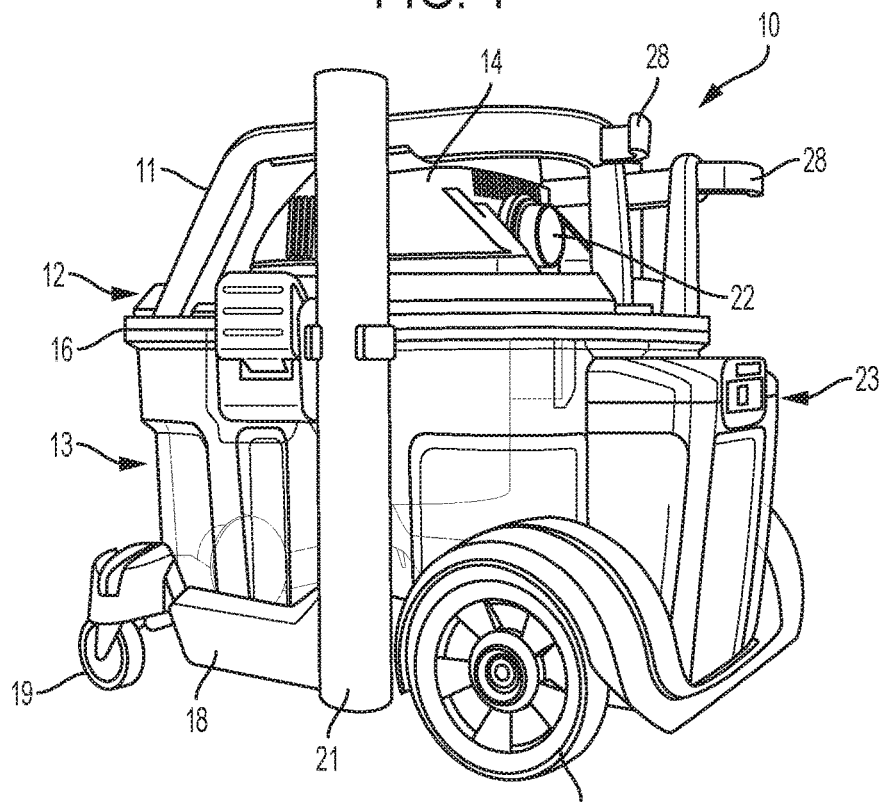
FIG. 2 shows a rear, side perspective view of a vacuum cleaner according to one embodiment of the present invention.

FIG. 2 shows a rear, side view of vacuum cleaner 10. The vacuum cleaner 10 includes the lid 12 and the collection receptacle 13. The lid 12 includes the housing 14 for housing a motor configured to suction matter into the vacuum cleaner 10. The housing 14 includes a hose input port 22. The vacuum cleaner 10 also includes a plurality of cord cleats 28 that extend from the peripheral rail 11. The cord cleats 28 can be used to store and position a power cord that supplies power to the motor.

The vacuum cleaner 10 includes an accessory holder 23. The accessory holder 23 is positioned adjacent to and facing the rear outside wall of the collection receptacle 13 and between the rear wheels 20. As described in more detail below, the accessory holder 23 can be removably attached from the vacuum cleaner 10. The accessory holder 23 can include a plurality of accessory retainers that provide different accessories having uses for different tasks, e.g., suctioning dry matter and suctioning wet matter. The vacuum cleaner 10 in FIG. 2 is shown with the lid 12 in a closed orientation with respect to the collection receptacle 13.

Figure 3:
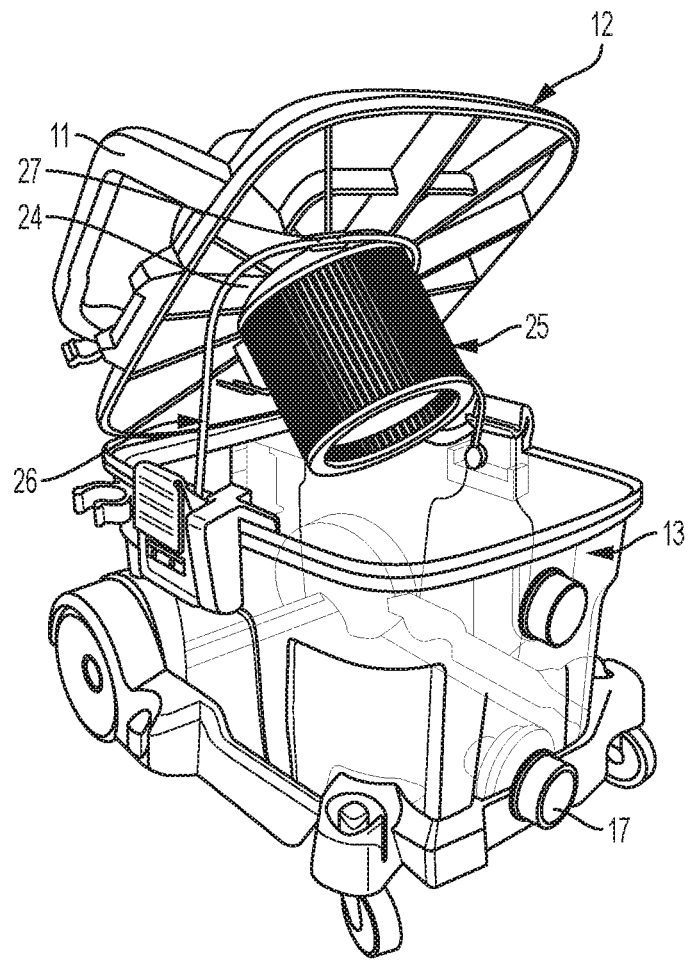
FIG. 3 shows a perspective view of a vacuum cleaner in an access orientation according to one embodiment of the present invention.

FIG. 3 shows the vacuum cleaner 10 with the lid 12 in an open or access orientation with respect to the collection receptacle 13. The access orientation allows manual access to a filter 25. The access orientation allows the removal of the filter 25 or cleaning of the filter 25 while the filter 25 is located over the collection receptacle. The lid 12 includes a filter carrier 24 that is adapted to hold the filter 25. The filter 25 is positioned so that during operation of the vacuum cleaner 10, matter collected by the vacuum cleaner 10 is filtered from at least one fluid stream in the vacuum cleaner 10.

The lid 12 can pivot between the closed orientation and the access orientation. The lid 12 is held in the access orientation by an at least one support member 26. In FIG. 3, the at least one support member 26 is a metal, wire-like structure. Additional other embodiments of support members are also described herein. The support member 26 engages a catch structure 27 formed in the bottom side of the lid 12 to secure the support member 26 into position with respect to the lid 12. The catch structure 27 is adapted to resist removal of the support member 26 from the catch structure 27 and is also adapted to provide stability for the lid 12 in the access orientation.

In some embodiments, the support member 26 can be spring-biased toward a grasp facilitating orientation. The grasp facilitating orientation is different from the orientation shown in FIG. 3 and the orientation of the support member 26 shown in FIG. 7. The grasp facilitating orientation can be an orientation of the support member 26 that provides for easier grasping or movement of the support member 26 upon first opening the lid 12. In some embodiments, the support member 26 can be held in a down position, e.g., the position shown in FIG. 7, by a release mechanism. The release mechanism can be actuatable to release the support member 26 to spring the support member 26 into the grasp facilitating orientation. In some embodiments, the release mechanism is actuated upon the opening of the lid 12 from the collection receptacle 13.

Figure 4:
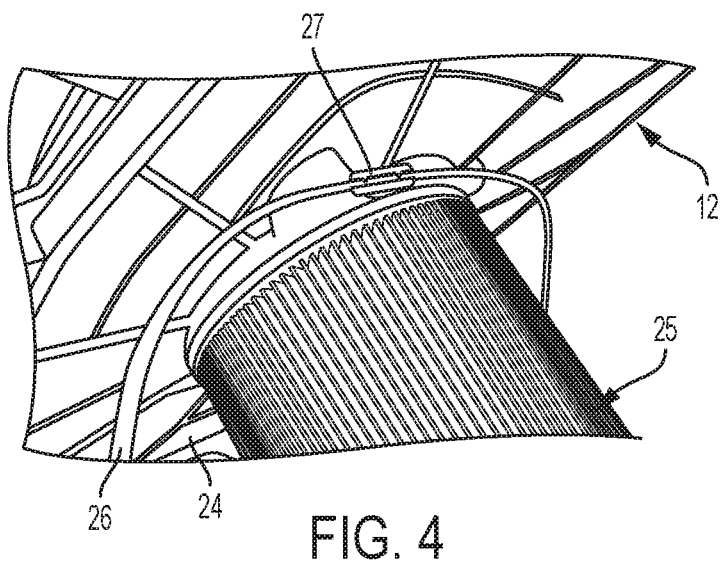
FIG. 4 shows a side view of a portion of a vacuum cleaner according to one embodiment of the present invention.

FIG. 4 shows a portion of the vacuum cleaner 10 where the support member 26 is engaged with a catch structure 27. The catch structure 27 is a recess having a complementary dimension to the support member 26 such that the support member 26 is securely positioned within the catch structure 27. The catch structure 27 can be made of a sufficiently rigid, but sufficiently flexible, material, for example a type of plastic or molded material, that permits a tight fit of the support member 26 in the catch structure 27, but still permits removal of the support member 26 upon application of a manual force. The catch structure 27 is configured to prevent removal of the support member 26 from the catch structure 27 until a predetermined force is applied to the support member 26 in a direction away from the catch structure 27. The catch 27 can be configured so that the predetermined force is greater than a force that the lid 12 exerts on the support member 26 when the lid 12 remains at rest in the access orientation. In some embodiments, the lid can comprise a plurality of catch structures, for example, to provide a plurality of access orientations and angles of access orientations. In some embodiments, the catch structure includes a release mechanism that can be actuated to facilitate disengagement of the at least one support member 26 from the catch.

Figure 5:
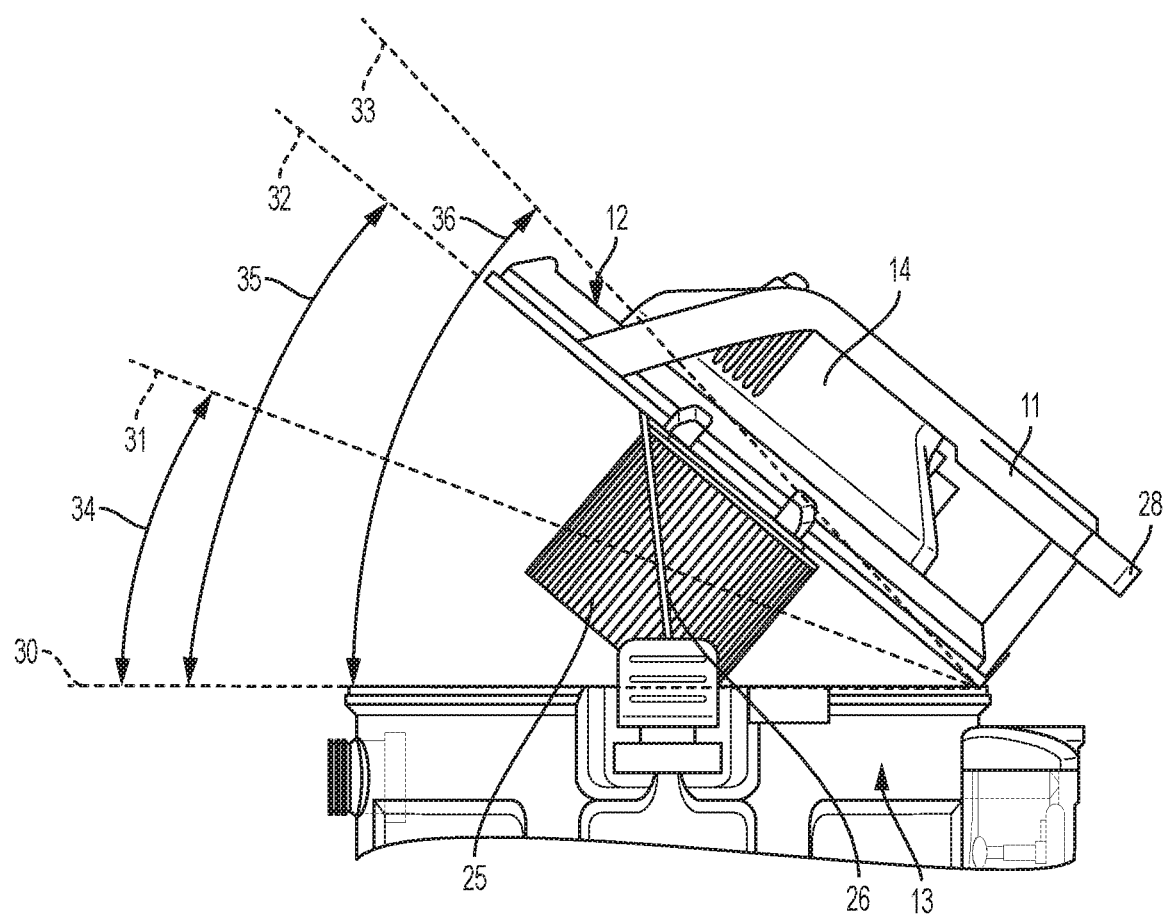
FIG. 5 shows a side view of a portion of a vacuum cleaner in an access orientation according to one embodiment of the present invention.

FIG. 5 shows a side view of the vacuum cleaner 10 with the lid 12 in the access orientation with respect to the collection receptacle 13. The angle of the lid 12 with respect to the top plane of the collection receptacle 13 can vary. In FIG. 5, the angle of the lid 12 is angle 35 which is defined by axis 30 and lid axis 32. In some embodiments, to permit sufficient access to the filter, the angle of lid 12 is at a minimum angle 34 which is defined by axis 30 and lid axis 31. In some embodiments, to permit sufficient stability and minimizing disengagement of coupling mechanisms for the lid 12 and collection receptacle 13 and to prevent issues with tipping of the vacuum cleaner 10, the angle of lid 12 is at a maximum angle 36 which is defined by axis 30 and lid axis 33. For example, the angle of the lid 12 with respect to the collection receptacle 13 can be in the range between about 20 degrees to about 50 degrees. In other embodiments, the angle of lid 12 in the access orientation can be within a range of angles determined by the dimensions of the filter 25. For example, this range of angles can be selected so that, when the lid 12 is oriented in the access orientation, an opening between a portion of the lid 12 and the collection receptacle 13 allows the filter 25 to be removed completely from the space between the lid 12 and the collection receptacle 13 regardless of the orientation of the filter 25.

In some embodiments, the aforementioned range of angles can be selected so that, when the lid 12 is oriented in the access orientation, the filter 25 can be removed completely from the space between the lid 12 and the collection receptacle 13 in some but not all possible orientations of the filter 25. In other embodiments, the range of angles can be selected so that, when the lid 12 is oriented in the access orientation, the filter 25 can be removed completely from the space between the lid 12 and the collection receptacle 13 in two substantially opposite orientations of the filter 25, but not all possible orientations of the filter 25. In still other embodiments, the filter 25 can comprise a substantially cylindrical shape and the range of angles can be selected so that, when the lid 12 is oriented in the access orientation, the opening between a portion of the lid 12 and the collection receptacle 13 is at least as large as a diameter of the filter 25 so that the filter 25 can be removed completely from the space between the lid 12 and the collection receptacle 13 by suitably orienting the filter 25 and removing it through the opening. In some embodiments, the angle of lid 12 can be about 42.5 degrees to achieve the access orientation.

Figure 6:
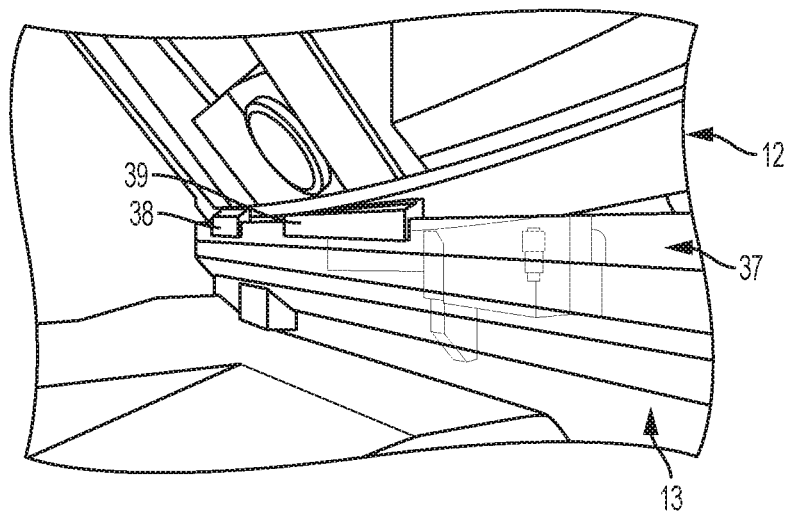
FIG. 6 shows a side view of a portion of a vacuum cleaner according to one embodiment of the present invention.

FIG. 6 shows a portion of the vacuum cleaner 10 where the lid 12 is coupled to the collection receptacle 13. The lid 12 comprises a first rim engager 38 and a second rim engager 39. The first rim engager 38 and the second rim engager 39 are coupled with a collection receptacle rim 37. The first rim engager 38 and second rim engager 39 have a complementary shape and structure to the collection receptacle rim 37 such that the rim engager 38 and rim engager 39 engage the rim 37 when the lid 12 is positioned in the access orientation and are adapted to interfere with any disengagement of the lid 12 from the rim 37. In some embodiments, the lid 12 comprises a single rim engager, and in other embodiments, the lid 12 comprises a plurality of discrete rim engagers. For example, one or more rim engagers can span substantially the entire width of the lid 12.

Figure 7:
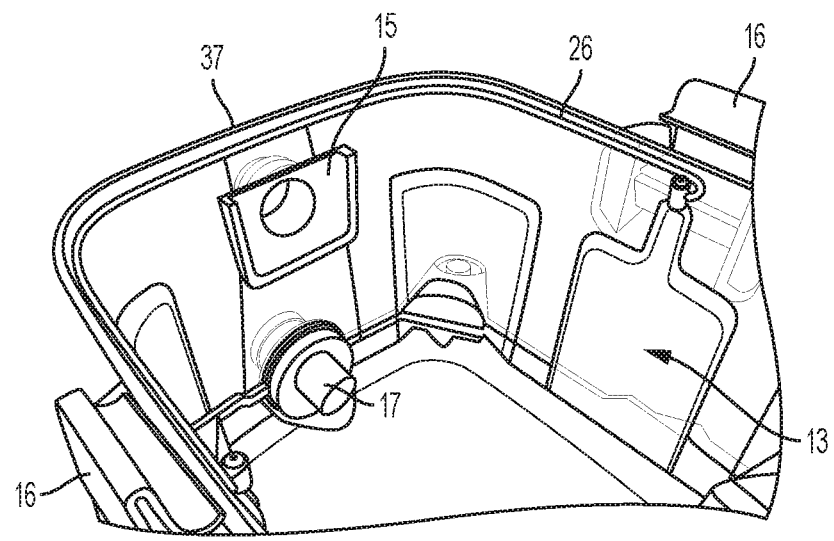
FIG. 7 shows a top perspective view of a collection receptacle according to one embodiment of the present invention.

FIG. 7 shows a top perspective view of the collection receptacle 13 with the lid 12 removed. The support member 26 is positioned in the down position along the top, inner perimeter of the collection receptacle 13 rim. The support member 26 is positioned such that it does not interfere with accessing the contents of the collection receptacle 13. In some embodiments, the top rim of the collection receptacle can include a support member holder, for example, a ledge on an inside wall of the collection receptacle 13 or a recessed groove in the rim of the collection receptacle 13, to hold the support member 26 in position. In FIG. 7, the support member 26 is pivotally mounted to the collection receptacle 13, which will be further described in view of FIGS. 9 to 10B. In other embodiments, for example, like the embodiment shown in FIG. 16, the support member can be pivotally mounted to the lid 12 and can be configured to engage a catch or the rim of the collection receptacle 13 when the lid 12 is placed into the access orientation.

Figure 8:
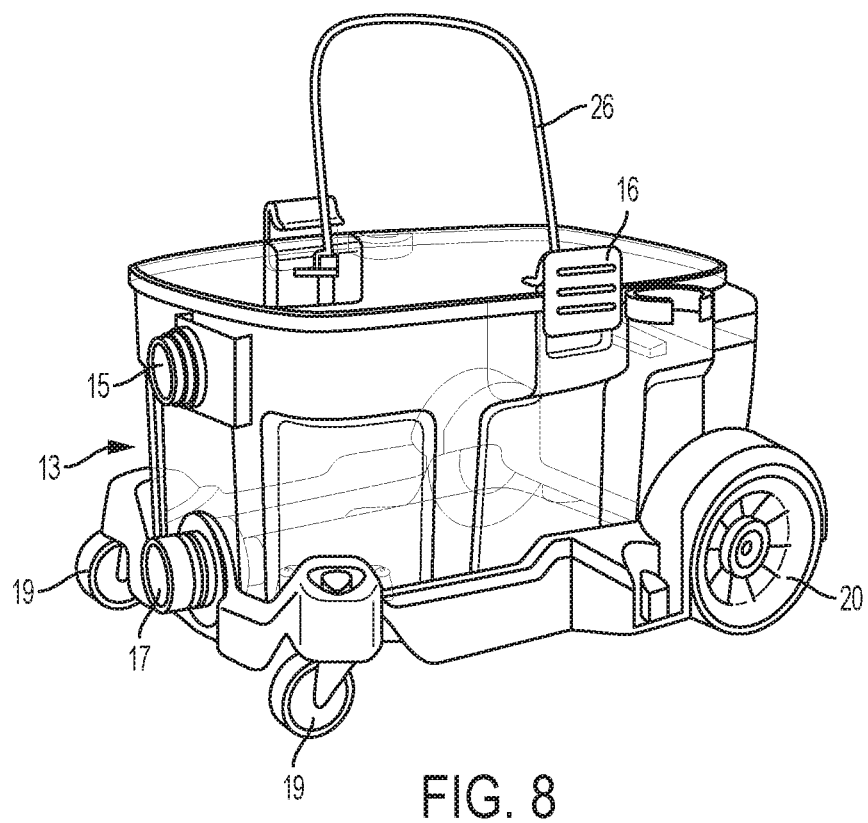
FIG. 8 shows a side perspective view of a collection receptacle according to one embodiment of the present invention.
Figure 9:
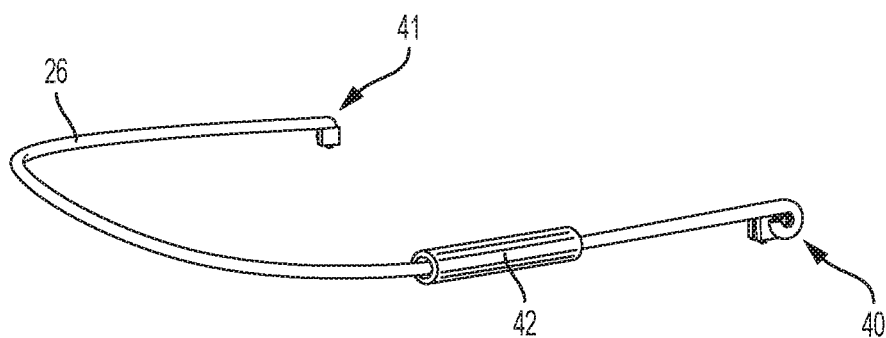
FIG. 9 shows a side view of a support member according to one embodiment of the present invention.

FIG. 8 shows a side perspective view of the collection receptacle 13 with the support member 26 in an upright position. The support member 26 is pivotally mounted to the collection receptacle 13 in a region near the latches 16. The support member 26 can serve as a handle when the contents of the collection receptacle 13 are being dumped out. In some embodiments, the support member 26 can comprise a grip. FIG. 9 shows the optional grip 42 that can be included on a support member 26. In some embodiments, the support member does not include a grip structure. The grip 42 can provide a more comfortable or ergonomic region for a user to grasp than other portions of the support member 26. In some embodiments, the grip 42 can be rotatably connected to the support member 26. One of ordinary skill in the art will appreciate that while the grip 42 in FIG. 9 is shown on a side portion of the support member 26, the grip 42 can be positioned at other portions of the support member 26. The grip 42, for example, can be slid to the approximate middle of the support member 26. Additionally, a plurality of grips 42 can be included on the support member 26 in different positions.

Figure 10A:
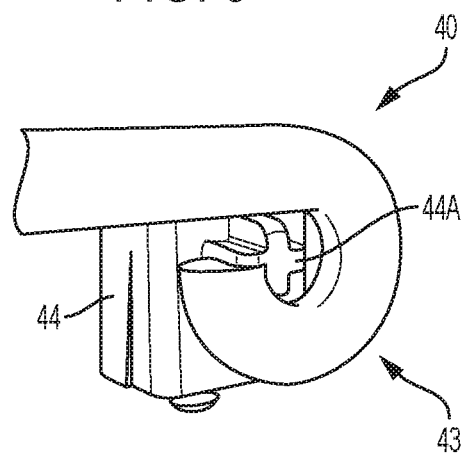
FIG. 10A shows a side view of a portion of a support member according to one embodiment of the present invention.
Figure 10B:
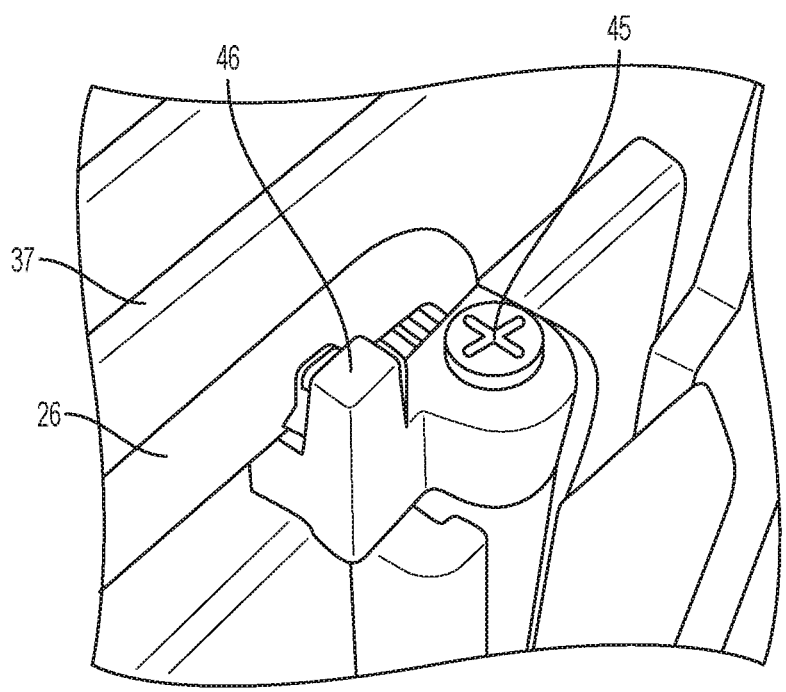
FIG. 10B shows a top view of a portion of a support member and collection receptacle according to one embodiment of the present invention.

FIG. 10A shows a first distal end 40 of support member 26. The distal end 40 includes an eyelet feature that permits the pivoting of the support member 26 about a peg 44A projecting out from the structure 44. FIG. 10B shows a top view of the distal end of the support member 26 when the support member 26 is positioned between an outer wall of the rim 37 of the collection receptacle 13 and a mounting screw 45 and a friction finger 46. The mounting screw 45 can be secured and tightened to position the support member 26 and resist pivotal movement of the support member 26 out from its down position. The friction finger 46 is positioned against the support member 26 when it is in the down position (e.g., the position shown in FIG. 7). The friction finger 46 can provide a structure to resist the movement of the support member 26 in the inside of the collection receptacle 13. The friction finger 46 can comprise materials known to one of ordinary skill in the art, including plastic or metal.

Figure 11:
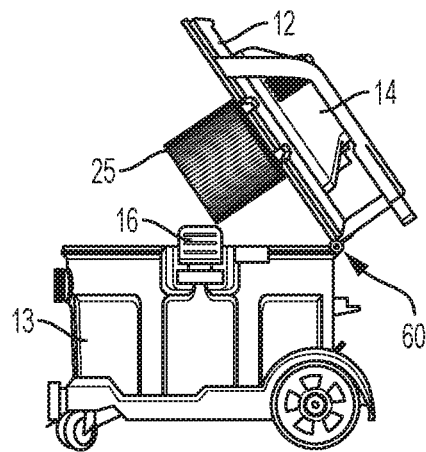
FIG. 11 shows a side view of a vacuum cleaner according to one embodiment of the present invention.

FIG. 11 shows a vacuum cleaner having support member 60. The lid 12 is pivotally moveable in relation to the collection receptacle 13. The vacuum cleaner shown in FIG. 11 is in the access orientation. The support member 60 can comprise a spring-loaded hinge. For example, after unlatching the latches 16 of the lid 12, the lid 12 can be angularly positioned by spring-loaded support member 60. The spring-loaded support member 60 can bias the lid 12 toward the access orientation with a force that can be manually opposed to move the lid 12 from the access orientation into the closed orientation. The support member 60 can provide a vacuum cleaner that does not require separation of the lid 12 from the collection receptacle 13. In some embodiments, the spring-loaded hinge support member 60 can comprise detents to allow the hinge to be open at predetermined angles for the access orientation.

Figure 12:
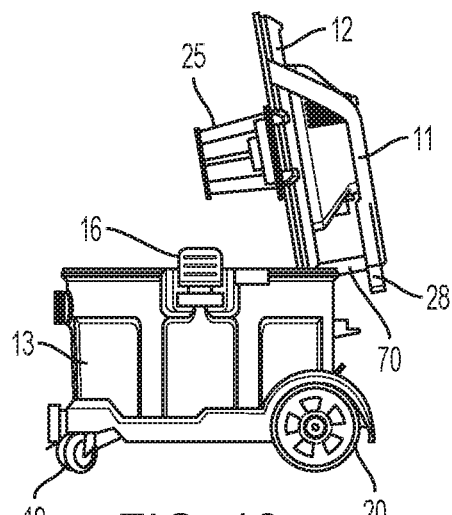
FIG. 12 shows a side view of a vacuum cleaner according to one embodiment of the present invention.
Figure 13A:
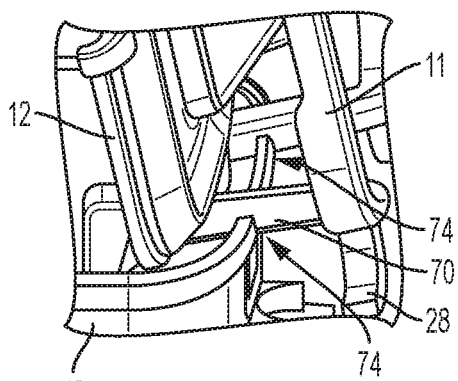
FIG. 13A shows a portion of the vacuum cleaner shown in FIG. 12 according to one embodiment of the present invention.
Figure 13B:
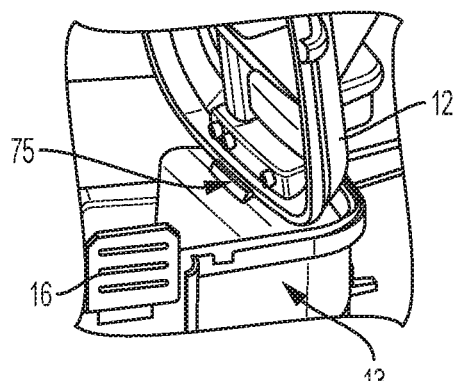
FIG. 13B shows a portion of the vacuum cleaner shown in FIGS. 12 and 13A according to one embodiment of the present invention.

FIGS. 12 and 13A-B show an additional embodiment of a vacuum cleaner 10 with a support member to aid the stable positioning of a lid 12 when the lid 12 is in an access orientation. The lid 12 comprises peripheral rails 11 with hose rail structures 70 that span the distance between the top of the lid 12 to the peripheral rail 11. The hose rail structures 70 are substantially vertically oriented when the lid 12 of the vacuum cleaner 10 is in the closed orientation on the collection receptacle 13. Upon the unlatching of the lid 12 from the collection receptacle 13, the lid 12 can positioned substantially perpendicular to the collection receptacle 13, so that the hose rail structures 70 are substantially horizontal. The hose rail structures 70 can then be positioned in a complementary recess or pocket 74 formed in the upper rim of the collection receptacle 13. In other embodiments, the hose rail structures 70 can include a recess or pocket (not shown) that accommodates the upper rim of the collection receptacle 12—to keep the rails from sliding off from the upper rim. FIG. 13A shows the hose rail structure 70 seated within the recess 74. The filter 25 remains positioned over the collection receptacle 13 to reduce the risk that any debris will fall outside of the collection receptacle 13 during cleaning or changing of the filter 25. As shown in FIG. 13B, the collection receptacle 13 can also include a bumper structure 75 that aids in the securing of the lid 12 in the access orientation by minimizing any movement of the lid 12 in a lateral direction toward the front of the vacuum cleaner 10 or any radial movement of the lid 12 toward the closed orientation.

FIG. 14 shows another embodiment of a vacuum cleaner comprising support member 80. The support member 80 comprises at least one cleat which is attached to the lid 12. The cleat 80 can be used to engage the back wall of the collection receptacle 13. The cleat 80 can comprise a shape and be positioned in a plurality of locations on the lid 12 so as to cooperate with the rim of the collection receptacle 13 to provide an optimal angle for the access orientation of lid 12 from both an accessibility perspective for a user to remove the filter 25 and a stability perspective of the lid 12 when in the access orientation. In other embodiments, the cleats can be attached to the collection receptacle 13, and the lid 12 be seated within the cleat support member attached to the collection receptacle 13.

FIGS. 15A and 15B show another embodiment of a vacuum cleaner having a plurality of support members 91, each having a first end 92 and a second end 93. In some embodiments like that shown in FIG. 15A, the support members 91 are affixed and positioned on the underside of the lid 12. In other embodiments, the support members 91 can be affixed and positioned on the rim of the collection receptacle 13. The second ends 93 of the support members 91 can be pivotally affixed to the underside of the lid 12. The support members 91 can be actuated by a user moving the first end 92 of the support members 91 such that the support members 91 pivot about the second end 93. The support members 91 can be used in tandem or independently.

As shown in FIG. 15B, the first end 92 can comprise a recess or groove 94. The groove 94 can be positioned to at least partially receive the top edge of the rim 37 of the collection receptacle 13. The groove 94 is defined between two tips 96 of the first end 92. The two tips 96 interfere with movement of the support members 91 in a direction perpendicular to the rim 37 of the collection receptacle 13 (e.g., toward the interior of the collection receptacle 13) when the rim 37 is at least partially received in the groove 94. This can provide the support members 91 with lateral stability. To prevent sliding of each first end 92 toward the front of the vacuum cleaner 10 beyond a desired position along the rim 37 after the grooves 94 at least partially receive the rim 37, the collection receptacle 13 can comprise one or more protrusions that interfere with such sliding. In some embodiments, the protrusions can comprise the latches 16, a simple projection, or pocket projection(s) 95 that include a pocket (not shown) which receives a respective tip 96 (shown in FIG. 15B) of the first ends 92. The positioning of the one or more protrusions can be selected to achieve one or more desired angles of access orientation. For a given length of the support members 91, the closer the protrusions are arranged toward the engagement point of the lid 12 with the collection receptacle 13, the greater will be the angle of the access orientation.

Figure 16:
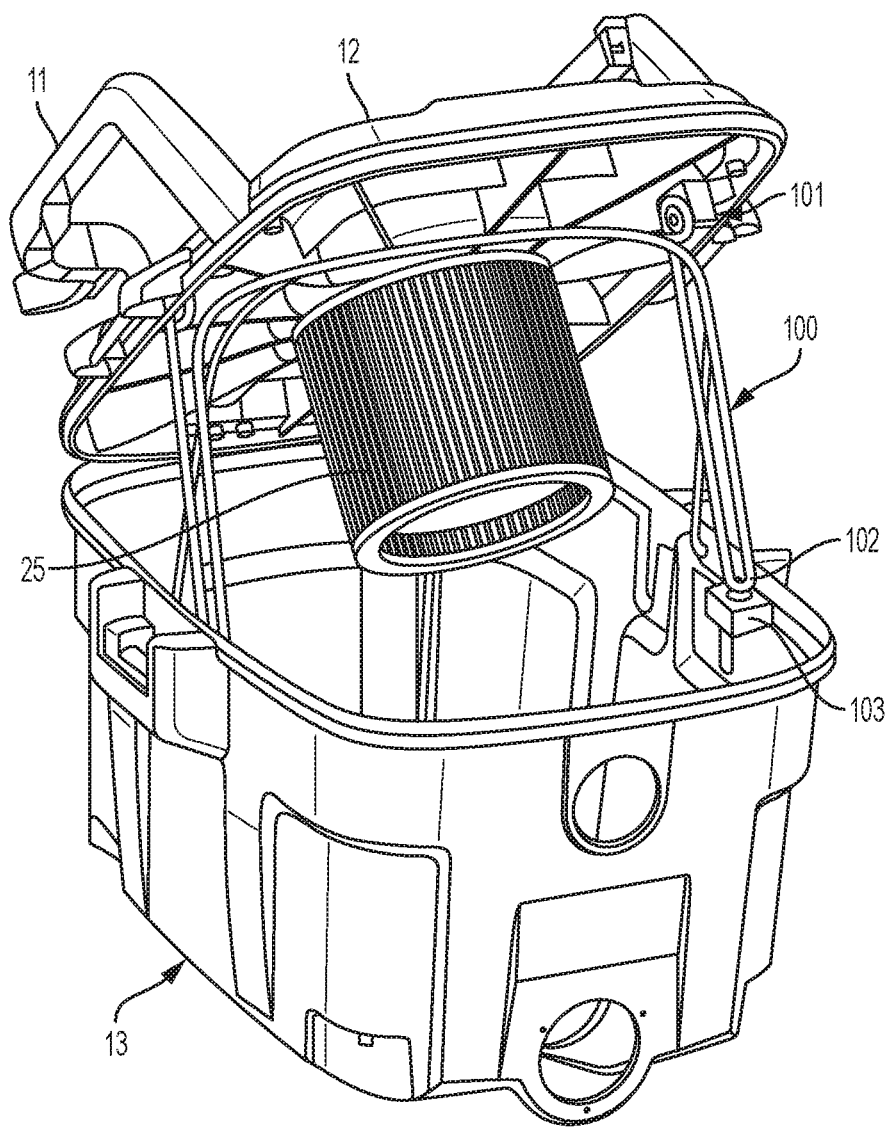
FIG. 16 shows a front perspective view of a vacuum cleaner according to one embodiment of the present invention.

FIG. 16 shows another embodiment of a vacuum cleaner comprising a support member 100. The support member 100 is pivotally mounted to the lid 12 at a first end 101. A second end 102 of the support member 100 can engage the collection receptacle 13 at a stop surface 103. In some embodiments, the stop surface 103 comprises a recess adapted to accommodate the second end 102 and inhibit the second end 102 from kicking out. In some embodiments, the stop surface 103 comprises a locking mechanism to lock the second end 102 in place. The locking mechanism can comprise a fastener, a locking pin, a latch, a catch, a clip, a recess or projection that provides press-fit retention, and/or the combination of a magnet and a magnetically attractable material. The support member 100 can pivot about the first end 101 such that the support member 100 is seated along the underside of the lid 12 when the lid 12 is in the closed orientation.

Figure 17:
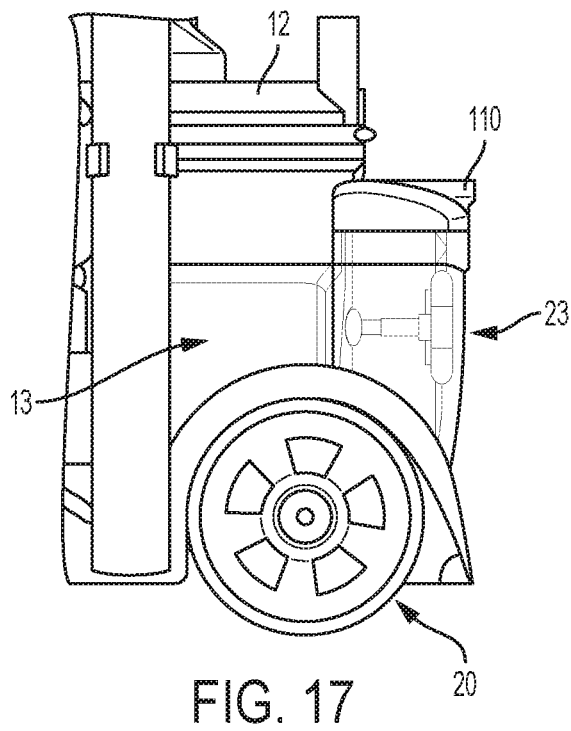
FIG. 17 shows a side view of a portion of a vacuum cleaner according to one embodiment of the present invention.
Figure 18:
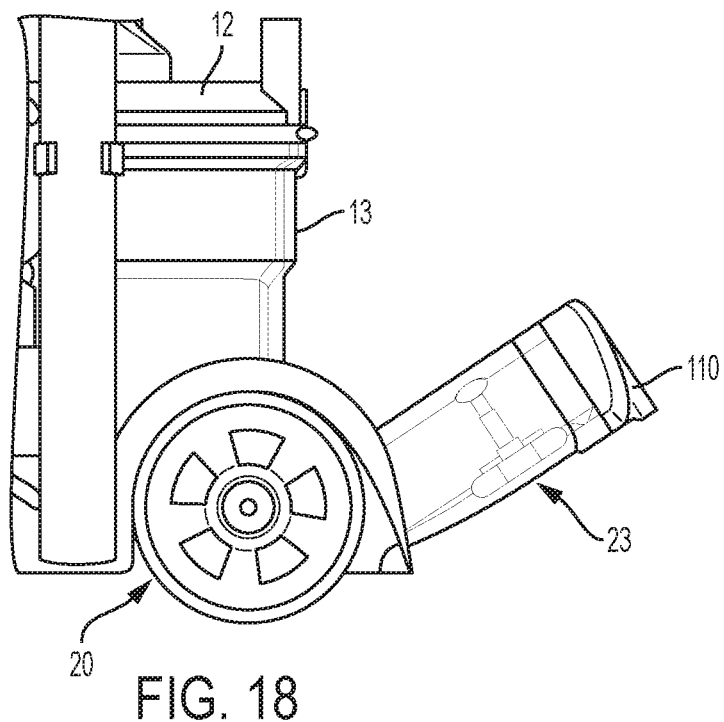
FIG. 18 shows a side view of portion of a vacuum cleaner having an accessory holder in an open orientation according to one embodiment of the present invention.
Figure 21:
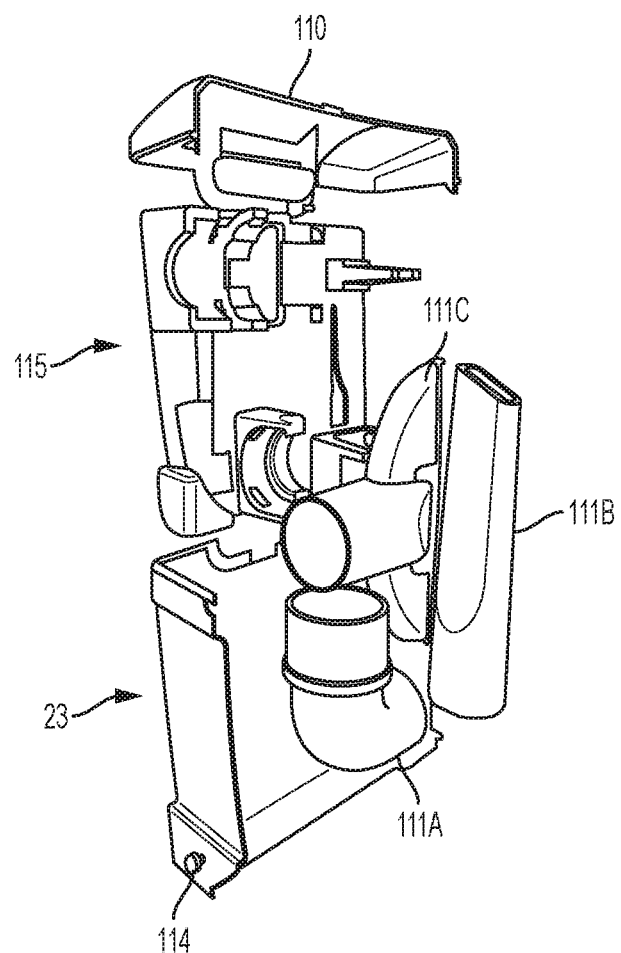
FIG. 21 shows an exploded view of an accessory holder according to one embodiment of the present invention.

FIG. 17 shows another embodiment of a vacuum cleaner 10 comprising an accessory holder 23. The accessory holder 23 is positioned in a closed orientation facing an outside wall of the collection receptacle 13. The accessory holder 23 can be configured to cooperate with the outside wall of the collection receptacle 13 to substantially enclose accessories retained by an accessory retainer 115 (non-limiting examples of which are shown in FIGS. 21, 21A, 21B and 21C) when the accessory holder 23 is in a closed orientation. The accessory holder 23 can include an accessory holder cover 110 that is positioned on top of the accessory holder 23. As shown in FIG. 18, the accessory holder 23 can be pivoted away from the outside wall of the collection receptacle 13 to an open orientation that allows access to the contents of the accessory holder 23. The accessory holder 23 can include the accessory retainer 115 and accessories 111A, 111B and 111C, or more accessories. FIG. 21A shows an exemplary accessory retainer 115 with accessories 111A, 111B, and 111C. Accessory 111A-111C can include, for example, an elbowed brush tool 111A, a crevice tool 111B, and a brushless floor tool 111C. The accessory retainer 115, as shown in FIG. 21, can have different retention features that are adapted to retain the differently configured accessories 111A, 111B, 111C. In some embodiments, the accessory retainer 115 can include indicia 115E-115G to indicate where each of the accessories 111A-111C can be retained by the accessory retainer 115. The indicia 115E-G can comprise one or more recesses, holes, printing, or other surface variations, or a combination thereof, which are configured to indicate where each accessory 111A-111C can be retained. The indication can be provided, for example, using text, a shape 115E-115G that represents the shape of the respective accessory 111A-111C, or color-coding, or any combination thereof. Color-coding and/or text can be provided on the accessories 111A-111C to match or otherwise indicate the designated location on the accessory retainer 115 for each accessory 111A-111C.

As shown in FIG. 21A, some embodiments of the accessory retainer 115 can be configured for removable attachment to the accessory holder 23. The example shown in FIG. 21A comprises an accessory retainer 115 that includes at least one snap tab 116 adapted to be received in respective slots or holes 120 in the accessory holder 23. The snap tab(s) 116 can be provided with a retention feature (e.g., the hooked heads 122 in FIG. 21A) that, after being inserted into the slots or holes 120, resists removal of the accessory retainer 115 from the accessory holder 23 until a sufficient amount of manual force is exerted against retention. In other embodiments, additional or alternative forms of retention features can be utilized, including but not limited to, fasteners or lateral rails 115H which project inwardly from the lateral side walls of the accessory holder 23 and engage lateral edges 115J of the accessory retainer 115 and inhibit removal of the accessory retainer 115. This engagement of the lateral edges 115J can be provided by way of a snap-fit, or in some embodiments that include a removable implementation of the cover 110, the engagement can be provided by removing the cover 110 and sliding the accessory retainer 115 with its lateral edges 115J under the rails 115H and into the accessory holder 23. In still other embodiments, the accessory holder 23 can comprise the snap tabs 116 or their equivalents, and the accessory retainer 115 can comprise slots or holes 120 or their equivalents.

In some embodiments, for example shown in FIG. 21, the accessory holder 23 can retain a first accessory retainer 115. In some embodiments, the first accessory retainer 115 can be removed and replaced by a second accessory retainer. In some embodiments, the second accessory retainer (non-limiting examples of which are shown in FIGS. 21B and C) can have a different configuration than the first accessory retainer 115. In some embodiments, the second accessory retainer can be adapted to retain at least one accessory that is different in configuration or function from any one or more, or all, of the accessories that the first accessory retainer 115 is adapted to retain. For example, the first accessory retainer 115 can be configured to retain an assortment of accessories adapted to draw liquid into the vacuum cleaner 10, and the second accessory retainer can be configured to retain another assortment of accessories adapted to draw dry matter into the vacuum cleaner 10. Each of the first accessory retainer 115 and the second accessory retainer can be retained within the accessory holder 23.

In some embodiments, the accessory holder 23 can be replaced by a second accessory holder that (1) has a different configuration from the accessory holder 23 and (2) is adapted to retain at least one accessory that is different in configuration or function from any one or more, or all, of accessories 111A-C that the accessory holder 23 is adapted to retain.

Figure 21C:
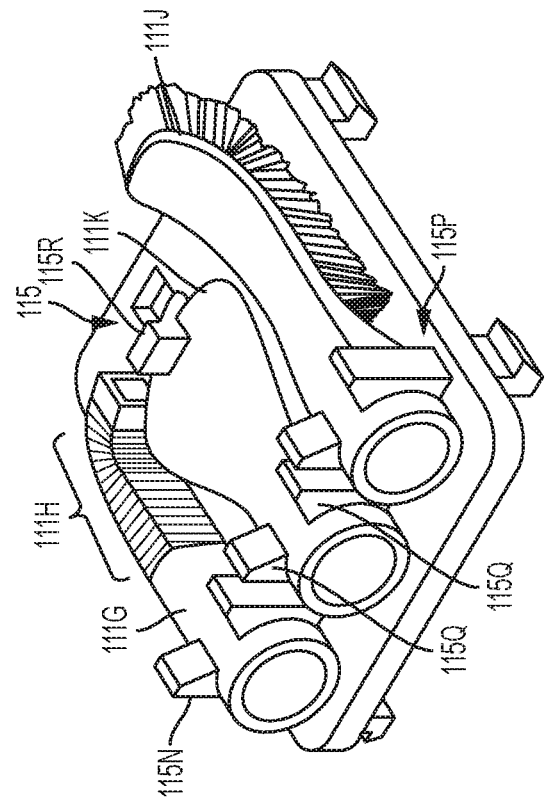
FIG. 21C shows a perspective view of an accessory holder according to one embodiment of the present invention.
Figure 21B:
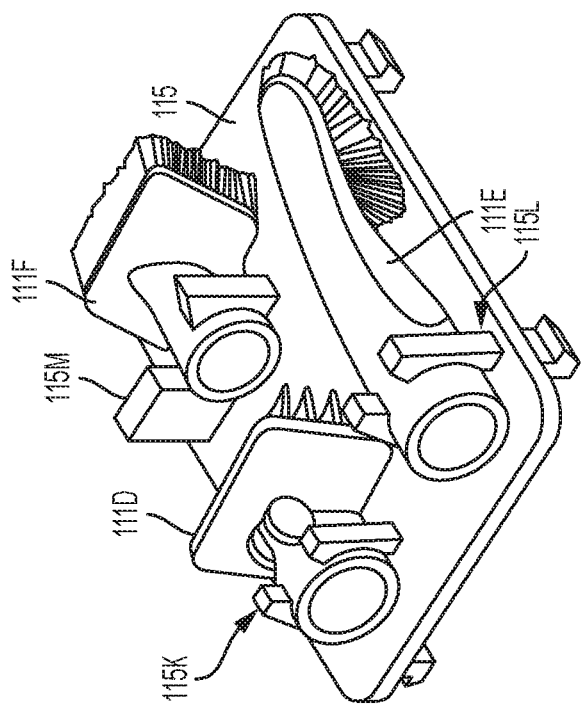
FIG. 21B shows a perspective view of an accessory holder according to one embodiment of the present invention.

FIGS. 21B and 21C show examples of accessory retainers 115 for examples of different sets of accessories. FIG. 21B, for example, shows a set of accessories that can comprise a pivotable squeegee tool 111D, an elongated brush tool 111E, and a fine-bristle cleaning brush, 111F, the combination of which might be useful in the context of pet cleaning. The corresponding accessory retainer 115 in FIG. 21B is configured to retain those accessories 111D-111F, for example, using retention features 115K, 115L, 115M.

FIG. 21C, for example, shows a set of accessories that can comprise a claw tool 111G with a flexible portion 111H, an angled brush tool 111J, and a flat crevice tool 111K, the combination of which might be useful in the context of cleaning automotive interiors. The corresponding accessory retainer 115 in FIG. 21C is configured to retain those accessories 111G, 111J and 111K, for example, using retention features 115N, 115P, 115Q, 115R.

The retention features 115A-115D and/or 115K-115R can be constructed using a resilient material that yields when the respective accessories are pushed into the retention feature by a user. The retention features 115A-115D and/or 115K-115R then grip the accessory when the accessory is properly seated and released by the user. The use of resilient material can minimize or prevent unwanted rattling of the accessories when the vacuum cleaner 10 is moved.

Figure 19:
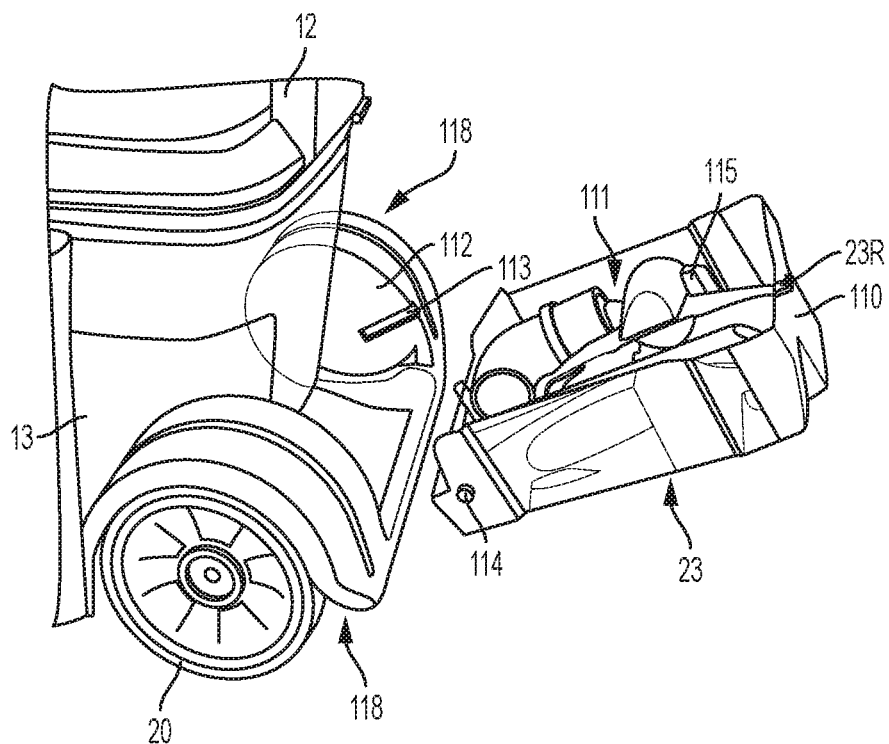
FIG. 19 shows a top, rear perspective view of a portion of a vacuum cleaner and an accessory holder according to one embodiment of the present invention.
Figure 20:
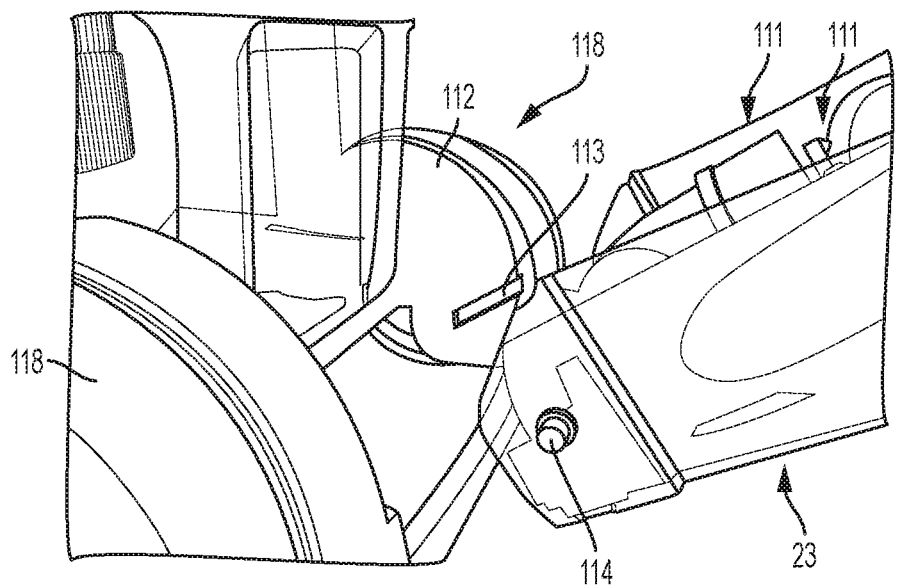
FIG. 20 shows a portion of a vacuum cleaner and an accessory holder according to one embodiment of the present invention.

FIGS. 19 and 20 show the accessory holder 23 removed from the vacuum cleaner 10. In some embodiments, the accessory holder 23 is configured to be manually removable from the vacuum cleaner 23 in a tool-less manner. The accessory holder 23 includes a protrusion or peg 114. A second peg (not shown) is on the opposite side of the accessory holder 23. Each peg 114 can be positioned inside a respective slot 113 of an inside surface 112 of the wheel housing 118. The slot 113 is configured such that the peg 114 can slide into the slot 113 toward the internal region of the wheel housing 118. The peg 114 and slot 113 can be configured to allow the peg to slide into the slot 113 only when the accessory holder 23 is oriented at a corresponding angle to the slot (e.g., as shown in FIG. 18).

Once inserted fully into the slot 113, the accessory holder 23 can be pivoted about the peg 114 axis to hold the accessory holder 23 in a closed position (e.g., as shown in FIG. 17). The slot-and-peg coupling provides a coupling that permits opening, closing, and removal of the accessory holder 23 in a convenient and secure manner without the need of a separate tool or fastener.

In some embodiments, the accessory holder 23 may be kept in a closed orientation by a retention mechanism 23R. For example, the retention mechanism 23R can comprise a fastener, a latch, a button, a locking pin, a catch, a clip, a recess or projection that provides press-fit retention, a combination of a magnet and a magnetically attractable material, and/or any other structure that impedes pivoting of the accessory holder 23 to an open orientation. The retention mechanism can be manually releasable to allow pivoting of the accessory holder 23 away from the outside wall of the collection receptacle.

By providing different accessory retainers 115 and/or the accessory holders 23 that are interchangeable by a user, a user is able to selectively equip the vacuum cleaner 10 for the task about to be undertaken, and change the retainer 115 and/or accessory holder 23 when a different task needs to be completed. Examples of additional sets of accessories that can be combined for retention by an accessory retainer 115 in an accessory holder 23 include, but are not limited to:

a. For automotive interior cleaning: any combination of some or all of the following accessories: (1) a crevice tool (e.g., extendable and/or flexible), (2) a stiff-bristled brush, (3) a delicate surface brush, (4) a seat cleaning tool, (5) a stain remover (e.g., in a spray container), (6) a lighted tool (e.g., a lighted crevice wand), or other tools that are useful when cleaning an automobile's interior.

b. For pet care: any combination of some or all of the following accessories: (1) a crevice tool, (2) a soft dusting brush, (3) a pet hair remover for upholstery, (4)

a lint roller, (5) a stain remover (e.g., in a spray container), or other tools that are useful in the context of pet care.

c. Wet vacuuming operations: (1) a wet-dry utility nozzle, (2) a water-resistant crevice tool, (3) a water-resistant squeegee tool, (4) a water-resistant floor tool, or any other tools that might be useful in the context of wet clean-up activities.

Additional sets can be configured, for example, to include tools that are particularly useful in the following contexts: (1) general cleaning, (2) fine particulate cleaning (e.g., dry-wall dust), and (3) cleaning in tight spaces. The accessory retainer 115 and/or accessory holder 23 also can be configured for storage of extra filters (e.g., filter bags).

In some embodiments, the accessory holder 23 can include indicia to indicate the use (or uses) to which its corresponding set of accessories is well-suited. The indicia can be applied to one or more portions of the accessory holder 23 that are visible to the user and can be applied, for example, to the cover 110 so that the indicia is visible when different accessory holders 23 are stacked horizontally on top of one another (e.g., on a shelf). The indicia can comprise one or more recesses, holes, printing, or other surface variations, or a combination thereof, which are configured to indicate the use (or uses) to which the corresponding set of accessories is well-suited. The indication can be provided, for example, using text, a shape (e.g., representing a pet, representing a car, representing one or more water drops, etc.), color-coding, or any combination thereof. Color-coding, shapes, and/or text also can be provided on the accessories to match or otherwise denote which accessories belong in a particular accessory retainer 115 and/or accessory holder 23.

Figure 22:
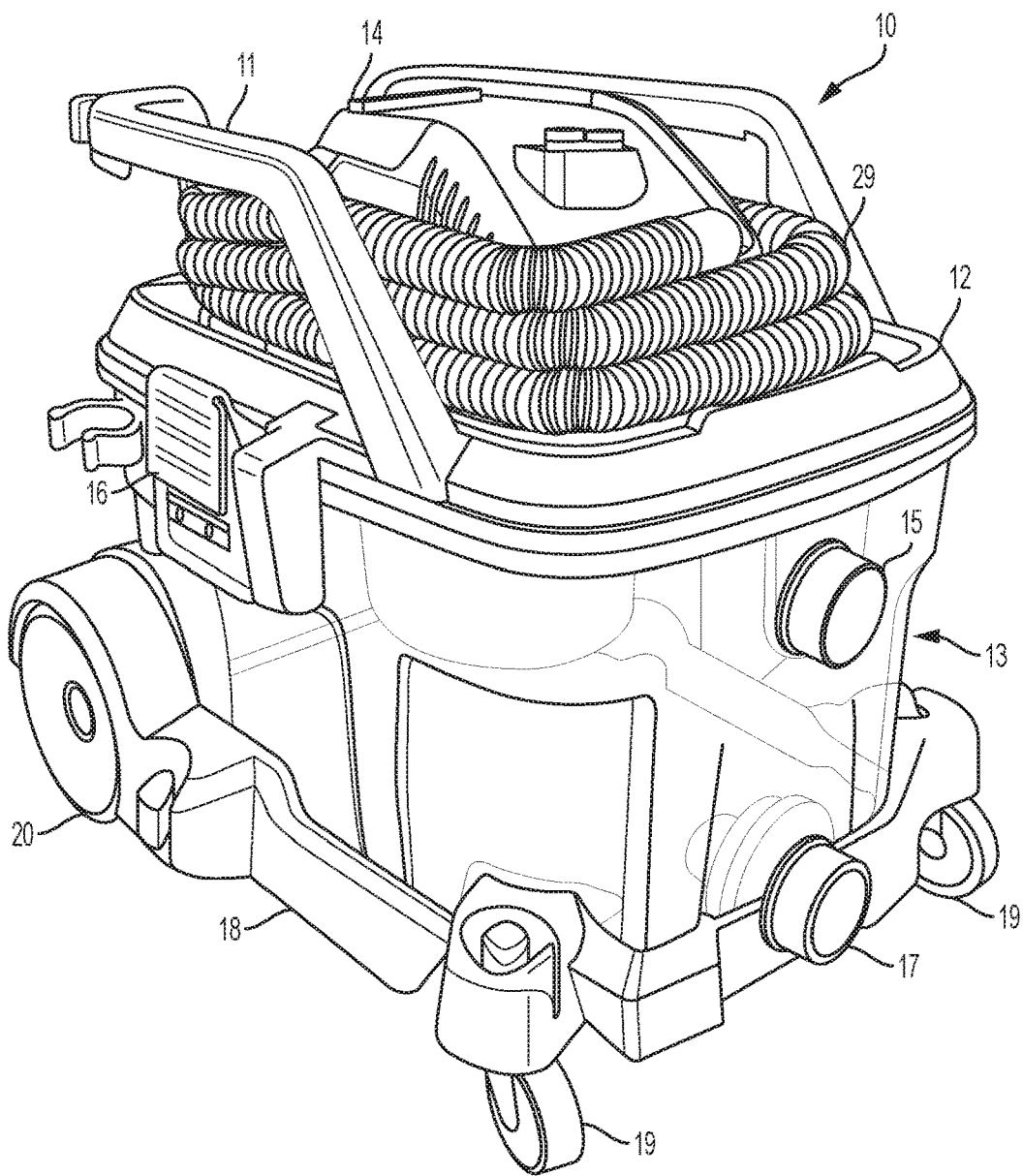
FIG. 22 shows a front, side perspective view of a vacuum cleaner according to one embodiment of the present invention.
Figure 23:
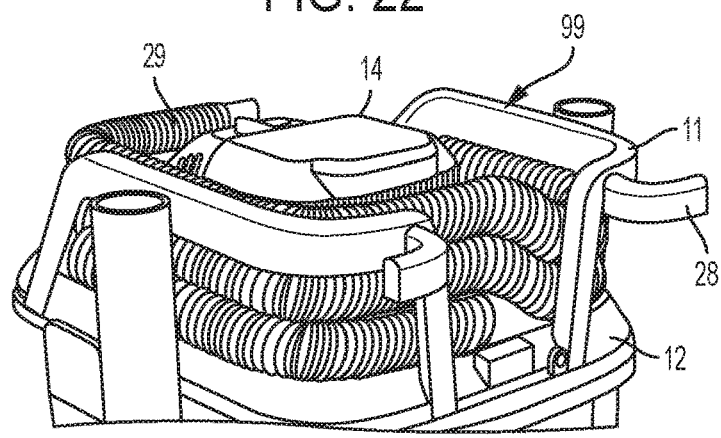
FIG. 23 shows a top, rear perspective view of a portion of a vacuum cleaner according to one embodiment of the present invention.

FIG. 22 shows a vacuum cleaner 10 with a hose 29 positioned on the top surface of the lid 12 and coiled around the housing 14 of the motor. The peripheral rails 11 provide an outer boundary to aid in the wrapping and secure placement of the hose 29 in a coiled configuration. The peripheral rails 11 can extend a height above the top of the coiled hose and be substantially aligned with the top surface of the housing 14. The peripheral rails 11 and the top of the housing 14 of the lid 12 can provide a planar working surface for a user. For example, a user may position a piece of plywood or lumber across the peripheral rails to provide a flat work surface. FIG. 23 shows a rear view of the vacuum cleaner 10 with a hose 29 positioned on the top surface of the lid 12. The peripheral rails 11 can include a protrusion or lip 99 which can provide a structure to minimize any undesired movement of the hose 29 in the upward direction.

Figure 24:
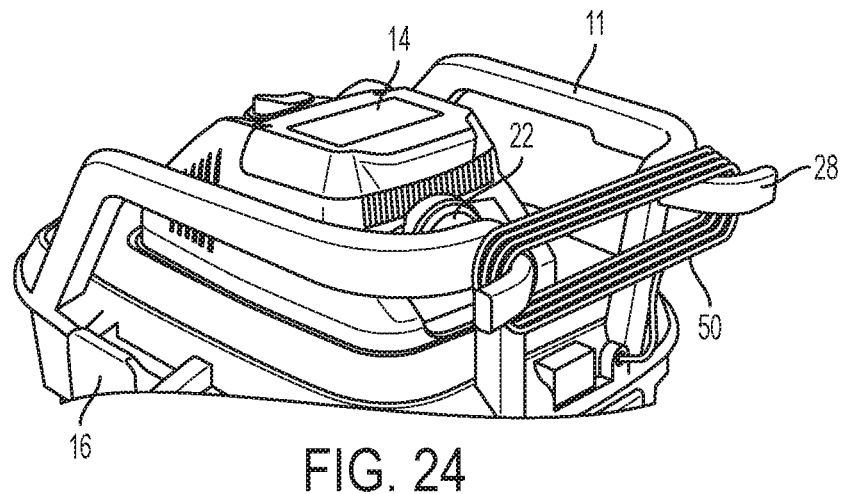
FIG. 24 shows a top, rear perspective view of a portion of a vacuum cleaner according to one embodiment of the present invention.
Figure 25:
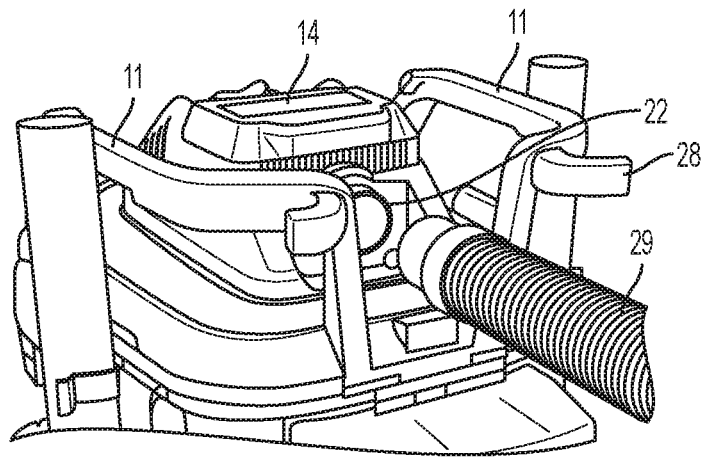
FIG. 25 shows a top, rear perspective view of a portion of a vacuum cleaner according to one embodiment of the present invention.
Figure 26:
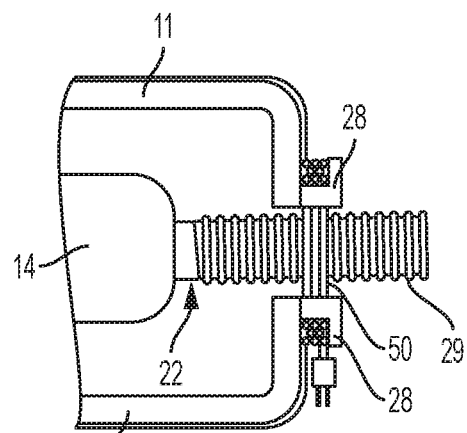
FIG. 26 shows a top view of a portion of a vacuum cleaner according to one embodiment of the present invention.

FIGS. 24 to 26 show the relative positioning of a power cord 50 and a hose 29. The cord cleats 28 provide a structure upon which the power cord 50 can be wrapped around. The spacing and dimensions of the cord cleats 28 provide a central opening so that the hose 29 can be connected to the input port 22 through the center of the power cord when wrapped around the cord cleats 28. FIG. 26 shows a top view of the vacuum cleaner where the hose 29 is connected to the motor, via the input port 22, and extends away from the vacuum cleaner 10 without interference of the power cord wrapped about the cord cleats 28.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A vacuum cleaner comprising:
a motor configured to suction matter into the vacuum cleaner through an input port of the vacuum cleaner;
a collection receptacle for receiving matter collected by the vacuum cleaner;
a lid adapted to cover the collection receptacle;
a filter carrier adapted to hold at least one filter to the lid and positioned so that, during operation of the vacuum cleaner, matter collected by the vacuum cleaner is filtered from at least one fluid stream in the vacuum cleaner;
at least one support member adapted to hold the lid stably in an access orientation that allows manual access to the at least one filter for removal from the filter carrier or cleaning of the at least one filter while the at least one filter is located over the collection receptacle, the at least one support member being positionable with respect to the lid or the collection receptacle so as to free the lid to move from the access orientation to a closed orientation with respect to the collection receptacle; and a support member holder adapted to hold the at least one support member in an orientation in which the at least one support member does not interfere with access to contents of the collection receptacle, wherein the support member holder comprises at least one ledge on at least one inside wall of the collection receptacle.

2. The vacuum cleaner of claim 1, wherein the at least one support member is mounted to the collection receptacle and is adapted to serve as a handle when contents of the collection receptacle are being dumped out.

3. The vacuum cleaner of claim 2, wherein the at least one support member includes a grip portion adapted to be more comfortable to a grasp than other portions of the at least one support member.

4. The vacuum cleaner of claim 3, wherein the grip portion is rotatably connected to another portion of the at least one support member.

5. The vacuum cleaner of claim 1, wherein the lid is pivotable between the access orientation and the closed orientation.

6. The vacuum cleaner of claim 5, wherein the at least one support member is pivotally mounted to the collection receptacle and the lid is pivotable between the access orientation and the closed orientation.

7. The vacuum cleaner of claim 1, further comprising a catch that is engageable by the at least one support member when the lid is oriented in the access orientation, and adapted to resist removal of the at least one support member from the catch and provide stability for the lid in the access orientation.

8. The vacuum cleaner of claim 1, wherein the lid includes at least one rim engager adapted to engage a rim of the collection receptacle when the lid is placed in the access orientation and adapted to interfere with disengagement of the lid from the rim.

9. The vacuum cleaner of claim 1, wherein the collection receptacle includes at least one edge engager adapted to engage an edge of the lid when the lid is placed in the access orientation and adapted to interfere with disengagement of the edge from the collection receptacle.

10. The vacuum cleaner of claim 1, wherein the at least one support member is pivotally mounted to the lid and the lid is pivotable between the access orientation and the closed orientation.

11. The vacuum cleaner of claim 1, further comprising at least one hose retainer on an upper portion of the vacuum cleaner and adapted to retain a vacuum cleaner hose in a coiled configuration.

12. The vacuum cleaner of claim 1, further comprising an accessory holder comprising a first accessory retainer removably attached to the accessory holder so that the first accessory retainer can be removed and replaced by at least a second accessory retainer that: (1) has a different configuration from the first accessory retainer and (2) is adapted to retain at least one accessory that is different in configuration or function from any accessories that the first accessory retainer is adapted to retain.

13. The vacuum cleaner of claim 1, wherein the at least one support member is spring-biased toward a grasp facilitating orientation which is different from an orientation in which the at least one support member is placed when the lid is in the closed orientation or in the access orientation.

14. The vacuum cleaner of claim 1, wherein the at least one support member is configured so that the access orientation achieves an opening between the collection receptacle and the lid that is large enough to allow the removal of the at least one filter entirely out from the vacuum cleaner.

15. A vacuum cleaner comprising:
- a motor configured to suction matter into the vacuum cleaner through an input port of the vacuum cleaner;
- a collection receptacle for receiving matter collected by the vacuum cleaner;
- a lid adapted to cover the collection receptacle;
- a filter carrier adapted to hold at least one filter to the lid and positioned so that, during operation of the vacuum cleaner, matter collected by the vacuum cleaner is filtered from at least one fluid stream in the vacuum cleaner; and
- at least one support member adapted to hold the lid stably in an access orientation that allows manual access to the at least one filter for removal from the filter carrier or cleaning of the at least one filter while the at least one filter is located over the collection receptacle, wherein the at least one support member is positionable with respect to the lid or the collection receptacle so as to free the lid to move from the access orientation to a closed orientation with respect to the collection receptacle, and wherein the at least one support member is spring-biased toward a grasp facilitating orientation which is different from an orientation in which the at least one support member is placed when the lid is in the closed orientation or in the access orientation.

16. The vacuum cleaner of claim 15, wherein the at least one support member is mounted to the collection receptacle and is adapted to serve as a handle when contents of the collection receptacle are being dumped out.

17. The vacuum cleaner of claim 16, wherein the at least one support member includes a grip portion adapted to be more comfortable to a grasp than other portions of the at least one support member.

18. The vacuum cleaner of claim 17, wherein the grip portion is rotatably connected to another portion of the at least one support member.

19. The vacuum cleaner of claim 15, wherein the lid is pivotable between the access orientation and the closed orientation.

20. The vacuum cleaner of claim 19, wherein the at least one support member is pivotally mounted to the collection receptacle and the lid is pivotable between the access orientation and the closed orientation.

21. The vacuum cleaner of claim 15, further comprising a catch that is engageable by the at least one support member when the lid is oriented in the access orientation, and adapted to resist removal of the at least one support member from the catch and provide stability for the lid in the access orientation.

22. The vacuum cleaner of claim 15, wherein the lid includes at least one rim engager adapted to engage a rim of the collection receptacle when the lid is placed in the access orientation and adapted to interfere with disengagement of the lid from the rim.

23. The vacuum cleaner of claim 15, wherein the collection receptacle includes at least one edge engager adapted to engage an edge of the lid when the lid is placed in the access orientation and adapted to interfere with disengagement of the edge from the collection receptacle.

24. The vacuum cleaner of claim 15, wherein the at least one support member is pivotally mounted to the lid and the lid is pivotable between the access orientation and the closed orientation.

25. The vacuum cleaner of claim 15, further comprising at least one hose retainer on an upper portion of the vacuum cleaner and adapted to retain a vacuum cleaner hose in a coiled configuration.

26. The vacuum cleaner of claim 15, further comprising an accessory holder comprising a first accessory retainer removably attached to the accessory holder so that the first accessory retainer can be removed and replaced by at least a second accessory retainer that: (1) has a different configuration from the first accessory retainer and (2) is adapted to retain at least one accessory that is different in configuration or function from any accessories that the first accessory retainer is adapted to retain.

27. The vacuum cleaner of claim 15, wherein the at least one support member is configured so that the access orientation achieves an opening between the collection receptacle and the lid that is large enough to allow the removal of the at least one filter entirely out from the vacuum cleaner.

* * * * *